(12) United States Patent
Aslam et al.

(10) Patent No.: US 12,149,415 B2
(45) Date of Patent: Nov. 19, 2024

(54) SYSTEM AND METHOD FOR TELEMETRY ANALYSIS OF A DIGITAL TWIN

(71) Applicant: BROADSTONE TECHNOLOGIES, LLC, Frederick, MD (US)

(72) Inventors: Taimur Aslam, Frederick, MD (US); Andrew J. Surwilo, Allendale, NJ (US)

(73) Assignee: BROADSTONE TECHNOLOGIES, LLC, Frederick, MD (US)

( * ) Notice: Subject to any disclaimer, the term of this patent is extended or adjusted under 35 U.S.C. 154(b) by 0 days.

(21) Appl. No.: 17/671,392

(22) Filed: Feb. 14, 2022

(65) Prior Publication Data

US 2022/0263734 A1 Aug. 18, 2022

Related U.S. Application Data

(60) Provisional application No. 63/200,108, filed on Feb. 14, 2021, provisional application No. 63/200,104, filed on Feb. 14, 2021, provisional application No. 63/200,105, filed on Feb. 14, 2021, provisional application No. 63/200,103, filed on Feb. 14, 2021.

(51) Int. Cl.
*H04L 41/14* (2022.01)
*G06N 7/01* (2023.01)
*G06Q 10/0635* (2023.01)
*H04L 9/40* (2022.01)
*H04L 43/028* (2022.01)
*H04L 61/4511* (2022.01)
*H04L 41/147* (2022.01)

(52) U.S. Cl.
CPC ............. *H04L 41/145* (2013.01); *G06N 7/01* (2023.01); *G06Q 10/0635* (2013.01); *H04L 43/028* (2013.01); *H04L 61/4511* (2022.05); *H04L 63/1416* (2013.01); *H04L 63/20* (2013.01); *H04L 41/147* (2013.01)

(58) Field of Classification Search
None
See application file for complete search history.

(56) References Cited

U.S. PATENT DOCUMENTS

| | | | |
|---|---|---|---|
| 2011/0153831 A1* | 6/2011 | Mutnuru | H04L 61/4511 709/226 |
| 2020/0142365 A1* | 5/2020 | Sharma | G05B 13/048 |
| 2021/0182996 A1* | 6/2021 | Cella | G05B 13/0265 |

* cited by examiner

*Primary Examiner* — Anh Nguyen
(74) *Attorney, Agent, or Firm* — Baker Botts L.L.P.

(57) ABSTRACT

A method for telemetry analysis of a digital twin includes analyzing network traffic sent or received by a host network. Entities exchanging data with the host network are identified. A plurality of applications within the host network used for sending or receiving the exchanged data may be identified. A digital twin of the host network is developed based upon the identified entities exchanging data with the host network and the applications within the host network used for sending or receiving the exchanged data. Stimuli may be applied to the digital twin, and the likelihood of a change in state within the host network is assessed based upon the applied stimuli.

20 Claims, 20 Drawing Sheets

≡ ⬠ Configuration           ⊕ Semper

⁝⁝ Pattern   ⁝ Slack   ⇄ Dropbox   △ Google Drive   ⌬ One Drive   ▦ Amazon S3   ▫ Office 365      ⬚ Report Add New Patterns ⦿ Pattern name    Upload file ⓘ

Name
Name

Pattern
/^[a-zA-Z0-9]*$/

[ Save ]

Filter:

| ⇅ Name | ⇅ Pattern | Action |
|---|---|---|
| AMERICAN EXPRESS CARD REGEX | \b3[47][0-9]{13}\b | ⊗ |
| DATES REGEX | \bd{2}[/-]d{2}[/-]d{4}\|-]d{4}[/-]d{2}[/-]d{2}[/-]d{2}[/-]d{2}\b | ⊗ |
| Email | \b[w.=-]+@[w.-]+.[w]{2,3}\b | ⊗ |
| FILE PATH REGEX | \b([a-zA-Z0-9-]+[/-]+[/-][a-zA-Z0-9-]+)+.[a-zA-Z]\.\\([a-zA-Z0-9()\*\/)*w.*.w*\b | ⊗ |
| ICD10 REGEX | \b[A-Z]d{2}[0-9A-Z]{0,4}\b | ⊗ |
| ICD9 REGEX | \bVd{2}.?d{1,2}\|Ed{3}.d{1,2}?d{3}.d{1,2}\b | ⊗ |

FIG. 6B

- Purpose
- Choice Type
- Other Type
- Audience Type
- Security Measure
- Retention Period
- Information Collected
- Choice Scope
- Collection Mode
- Action First-Party
- Personal Information Type
- Third Party Entity
- Access Type
- Identifiability
- Action Third Party

FIG. 7B

| ⊕ Purpose |
|---|

| ⊕ Choice Type |
|---|

| ⊕ Other Type |
|---|

| ⊕ Audience Type |
|---|

| ⊕ Security Measure |
|---|
| Because pinterest is a worldwide service, we may transfer the personal data of eea residents to a country outside the eea. We have a legitimate interest in using information we collect to customize your pinterest experience based on your offsite behavior. Our mission is to bring everyone the inspiration to create a life they love. Pinterest is a worldwide service. ... |

| ⊕ Retention Period |
|---|
| We may also retain certain information in our backup systems for a limited period of time, or as required by law. We keep your information only so long as we need it to provide pinterest to you and fulfill the purposes described in this policy. We only use that information where we have a proper legal basis for doing so. ... |

| ⊕ Information Collected |
|---|

| ⊕ Choice Scope |
|---|

| ⊕ Collection Mode |
|---|

| ⊕ Action First-Party |
|---|

| ⊕ Personal Information Type |
|---|

| ⊕ Third Party Entity |
|---|

| ⊕ Access Type |
|---|

| ⊕ Identifiability |
|---|

| ⊕ Action Third Party |
|---|

FIG. 7C

| Privacy Policy | | | example.com | Search |
|---|---|---|---|---|
| Show 10 ▼ entries | | | Filter | |
| Data partner google.com | ⇵ Privacy policy ☑ | | | |
| Version | Date | Readability | | Similarity Index |
| Last Version | 10/15/2019 17:00 | 71.17 | | |
| Parsed Version | 03/31/2020 17:00 | 67.07 | | 95.2% |
| pintrest.com | ☑ | | | |
| Version | Date | Readability | | Similarity Index |
| Last Version | 11/1/2016 17:00 | 75.9 | | |
| Parsed Version | 01/1/2020 17:00 | 73.22 | | 55.7% |
| quora.com | ☑ | | | |
| Version | Date | Readability | | Similarity Index |
| Last Version | 05/18/2018 5:14 | 65.97 | | |
| Parsed Version | 12/20/2019 5:14 | 64.07 | | 72.0% |

FIG. 7D

SYSTEM AND METHOD FOR TELEMETRY ANALYSIS OF A DIGITAL TWIN

RELATED APPLICATION

This application claims the benefit of U.S. Provisional Patent Application Nos. 63/200,108 filed on Feb. 14, 2021; 63/200,103 filed on Feb. 14, 2021; 63/200,104 filed on Feb. 14, 2021; 63/200,105, filed on Feb. 14, 2021; the disclosure of each of which are incorporated herein by reference in their entirety.

BACKGROUND

The present disclosure relates generally to network communication analysis, and more particularly to a system and method for telemetry analysis of a network digital twin.

SUMMARY

In accordance with a particular embodiment of the present disclosure, a method includes analyzing network traffic sent or received by a host network. Entities exchanging data with the host network are identified. A plurality of applications within the host network used for sending or receiving the exchanged data are identified. A digital twin of the host network is developed based upon the identified entities exchanging data with the host network and the applications within the host network used for sending or receiving the exchanged data. In accordance with a particular embodiment, stimuli are applied to the digital twin, and the likelihood of a change in state within the host network is assessed based upon the applied stimuli.

BRIEF DESCRIPTION OF THE DRAWINGS

FIG. 6B illustrates a GUI display of regular expressions analysis, in accordance with another embodiment of the present disclosure;

FIG. 7B illustrates a GUI display of a topic map resulting from a taxonomy, in accordance with another embodiment of the present disclosure;

FIG. 7C illustrates a GUI display of a topic map resulting from a taxonomy, in accordance with another embodiment of the present disclosure;

FIG. 7D illustrates a GUI display of similarity index, in accordance with another embodiment of the present disclosure;

DETAILED DESCRIPTION OF DISCLOSED EMBODIMENTS

Figure 1:
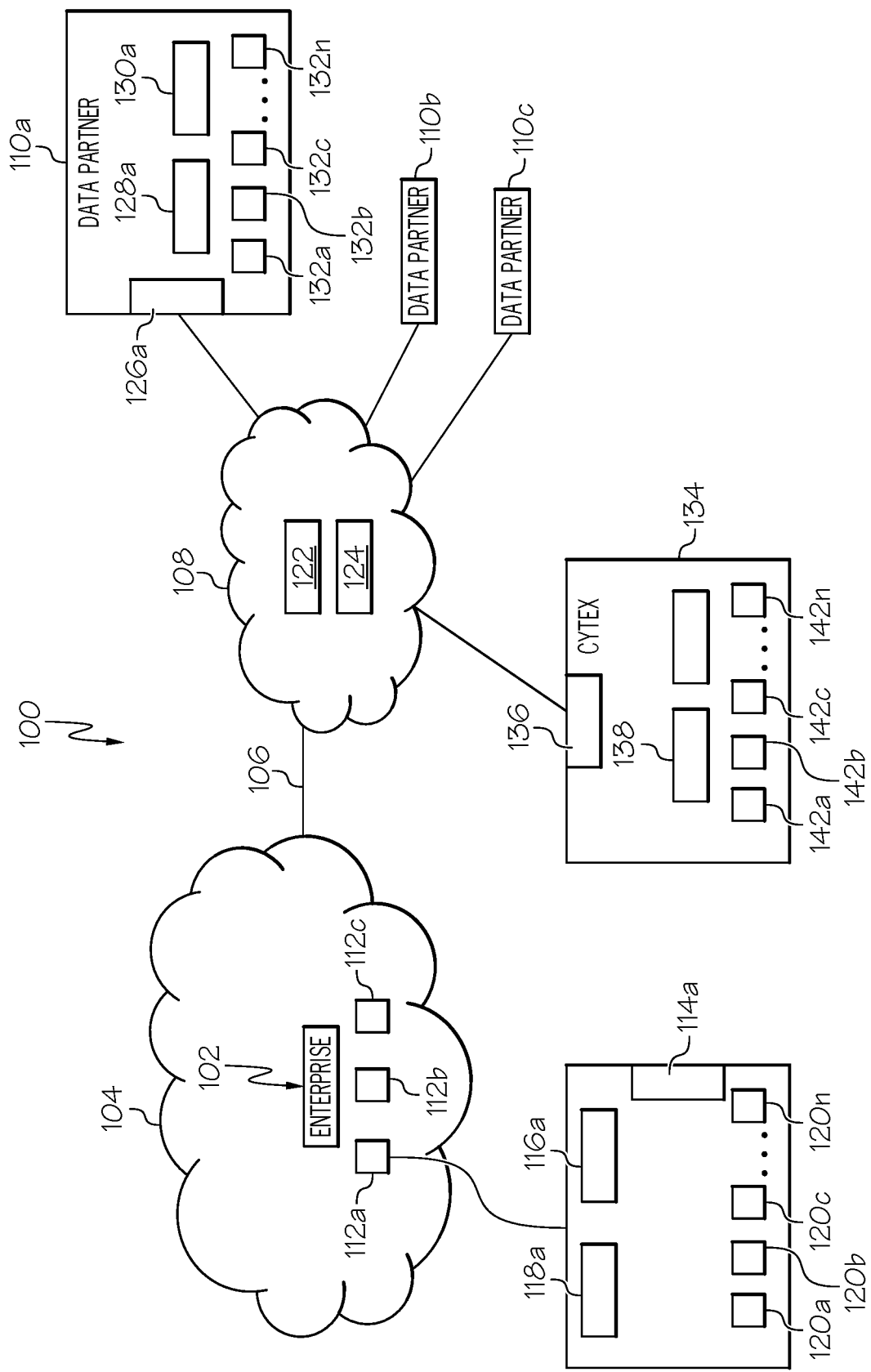
FIG. 1 illustrates a block diagram of a system for analysis of network communications, in accordance with a particular embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Moreover, any functionality described herein may be accomplished using hardware only, software only, or a combination of hardware and software in any module, component or system described herein. Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including a symbolic programming language such as Assembler, an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Per, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or router (centralized components that transmits and receives traffic using, for example, TCP/IP, 4G, 5G, LTE, or satellite connectivity) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Business enterprises are increasingly relying upon digital assets to improve their competitive advantage. As businesses become more digital, the security of the digital assets of the enterprise, including all data that enters or exits the enterprise in the ordinary course of business, become important as well.

Attacks on enterprises are increasing exponentially as enterprises rely more and more on the ability to communicate data with third parties in real time and in support of its critical business operations. Such attacks take many forms including cybercriminals seeking extortion through ransomware, denial of service, or theft of trade secrets.

Data usage is regulated by organizations and regulatory standards such as Health Insurance Portability and Accountability Act (HIPAA), General Data Protection Regulation (GDPR), California Consumer Privacy Act (CCPA), Payment Card Industry (PCI), Association of International Certified Professional Accountant's Trust Services Criteria for Security, Availability, Processing Integrity, Confidentiality, and Privacy, Cybersecurity Maturity Model Certification (CMMC), and International Standards Organization standard for information security. These regulations place restrictions on data usage and storage of data collected from users. Once data is collected by an enterprise, it is expected that the enterprise will safeguard the data at rest, data in transmission, and ensure compliance by its data partners to whom it may have disclosed the data.

In order to understand the potential exposure and vulnerabilities of an enterprise, they must understand and gain significant visibility into their data supply chain. The data supply chain includes all resources internal or external to the enterprise, that are used in the transmission or receipt of data, and may also be referred to as the digital supply chain. Data supply chain may include data stored within or outside of the organization. These may include data storage applications used to operate their business, such as CRM applications and databases, as well as any application inside or outside of the enterprise, operated by the enterprise or a third party, used in or relied upon for the operation of the business enterprise. For each such application, it is helpful to inventory and understand all software applications including version numbers, software publishers, and software dependencies. This information can be built into the digital twin model referred to below, in order to get a more accurate representation of the networks and data supply chain.

Most enterprises rely upon a plurality of outside vendors, service providers, government agencies and other third parties (i.e., data partners) to exchange data with or store data for, the enterprise. The data supply chain will also include third parties that own, operate or provision services for digital communication and network infrastructure. A full understanding of the network configurations in the data supply chain benefits from a complete inventory of all the outbound and inbound network connections within the data supply chain of the enterprise.

Any given enterprise will typically rely upon dozens, hundreds or even thousands of software applications within the enterprise to communicate and store data. Moreover, each of the third parties that the enterprise relies upon outside of the enterprise may have an equal or larger number of software applications used to provide or support the data supply chain of the enterprise. Thus, in order to truly understand the complexity and potential vulnerability of the data supply chain, the visibility of the enterprise into digital assets that support its supply chain should be granular so an enterprise knows precisely which versions of a software application are installed, the vendor who provided the application, dependencies on and with other applications and whether a security vulnerability has been disclosed for the application or the vendor.

Given the sheer number of vendors and applications that a given enterprise may rely upon to support its data supply chain, it is difficult to keep an accurate inventory or to keep track of the security vulnerabilities that affect those assets. Moreover, it is difficult to predict how a particular enterprise or data supply chain will react to certain stimuli imposed upon the data supply chain.

FIG. 1 illustrates a communication network 100 that includes an enterprise 102 operating within a network owned or controlled by the enterprise 102. A firewall (used by the organization to allow or prevent access to certain domains or ports) protected communication link 106 connects network 104 of enterprise 102 with a public network 108 that facilitates communication using Internet Protocol (IP) over any transport network including but not limited to fiber optics, Ethernet, ATM, and cellular, between and among enterprise 102 and multiple third part data partners 110a-c. In the illustrated embodiment, enterprise 102 is reflected within a single network 104. However, it will be understood by those of ordinary skill in the art that any given enterprise may employ many different networks simultaneously, such as local area network (LAN), wide area network (WAN), or a Software Defined WAN (SD-WAN), some of which may be separated geographically (e.g., an enterprise with multiple places of doing business). Reference to the network 104 of enterprise 102 is not intended to apply only to a situation in which a single "private" network is employed by the enterprise, as many enterprises rely on several private networks to work in conjunction with each other, and such private networks may be geographically separated.

The Internet Protocol (IP) is the most common data protocol in use today. IP protocol is a layer 4 transport protocol as defined in the layered protocol model in the Open Systems Interconnection Model (OSI). Application layer protocols at layer 7 of the OSI model, are built on the IP datagram functionality. IP data exchange offers both a stream-oriented protocol identified as Transmission Control Protocol (TCP) and a connectionless protocol identified as User Datagram Protocol (UDP). Both IP and UDP identify source and destination by a source IP address, source port, destination IP address, and a destination port. In addition to these identifiers, higher level application protocols also use Uniform Resource Locators (URL) and Domain Name System (DNS) as identifiers. The identity of data source can be established by asymmetric cryptographic systems that rely on a private and public key infrastructure. In addition, The public key of an entity can be cross signed by a trusted entity using a secure hash algorithm SHA-2. This cross-signing is similar to a notarized document that is produced after completing the requisite identity vouching protocols.

Enterprise 102 employs a plurality of servers 112a-c to store and communicate data on behalf of the enterprise. FIG. 1 includes an exploded view of server 112a for illustrative purposes. Each server 112a-c includes a network interface 114a, storage 116a, processors 118a and a plurality of software applications 120a-n to support its data supply chain internally. Given the total number of software applications that may be used internal to enterprise 102 in the data supply chain, it is difficult to keep track of all of the software titles, vendors, version numbers, license terms and interoperability/compatibility issues that may impact or potentially impact the data supply chain, based upon hardware and software within the organization. It is also difficult to predict or anticipate what impact a change(s) in hardware, software, or network operation(s) may have on the data supply chain. For this reason, it is helpful to keep an accurate inventory of all hardware and software applications used in the data supply chain, within the enterprise. This information may be used, in part, to build a digital twin model of the data supply chain, for analysis consistent with the teachings of the present disclosure.

In addition to the hardware and software within the enterprise, it is also important to understand as much as possible about the hardware and software used by third parties, that are necessary to support the data supply chain of the organization. For example, it is important to understand critical information about the hardware 122 and software 124 used to support network communications across network 108. Also, each third party in the data supply chain, for example, data partners 110a-c, will have an infrastructure similar to enterprise 102, that is used to support the data supply chain of enterprise 102. FIG. 1 includes an exploded view of data partner 110a as one example of the components the support the data supply chain of enterprise 102. Data partner 110a relies upon a network interface 126, storage 128a, hardware 130a and applications 132a-n to support the data supply chain of enterprise 102.

It is not always possible to get a complete inventory or all hardware and software used by data partners. Some third parties keep accurate information regarding the hardware and software used in its infrastructure, and an enterprise seeking to employ the teachings of the present disclosure may rely upon information provided by such third parties as accurate. A third party vendor may also agree to do an internal audit in order to provide this information to an enterprise that is seeking to build a digital twin of the digital infrastructure. Alternatively, the third party may agree to participate in a collaborative audit with the enterprise.

However, even if little information is made available by the third party, certain information about the data supply chain can be gleaned by monitoring network traffic in and out of the enterprise. For example, using information obtained from a DNS server (server is the server that translates URIs and URLs) employed by the enterprise (either internal or external to the network 104 of the enterprise) certain intelligence about the data supply chain may be collected.

Certain features and functions of the present disclosure may be embodied in and/or at least partially accomplished by a third-party server 134 (labelled Cytex) that resides outside of network 104 of enterprise 102. Similar to data partners 110a-c, Cytex server 134 includes a network interface 136, storage 138, processors 140 and applications 142a-n. Server 134 or any other server described herein may also include a DNS resolver (e.g., a Domain Name Server that maps the high-level human representation of sites to a network address) and/or a DNS analyzer (DNS queries and network traffic is analyzed, processed, and prepared for a machine learning algorithm(s)).

Figure 2:
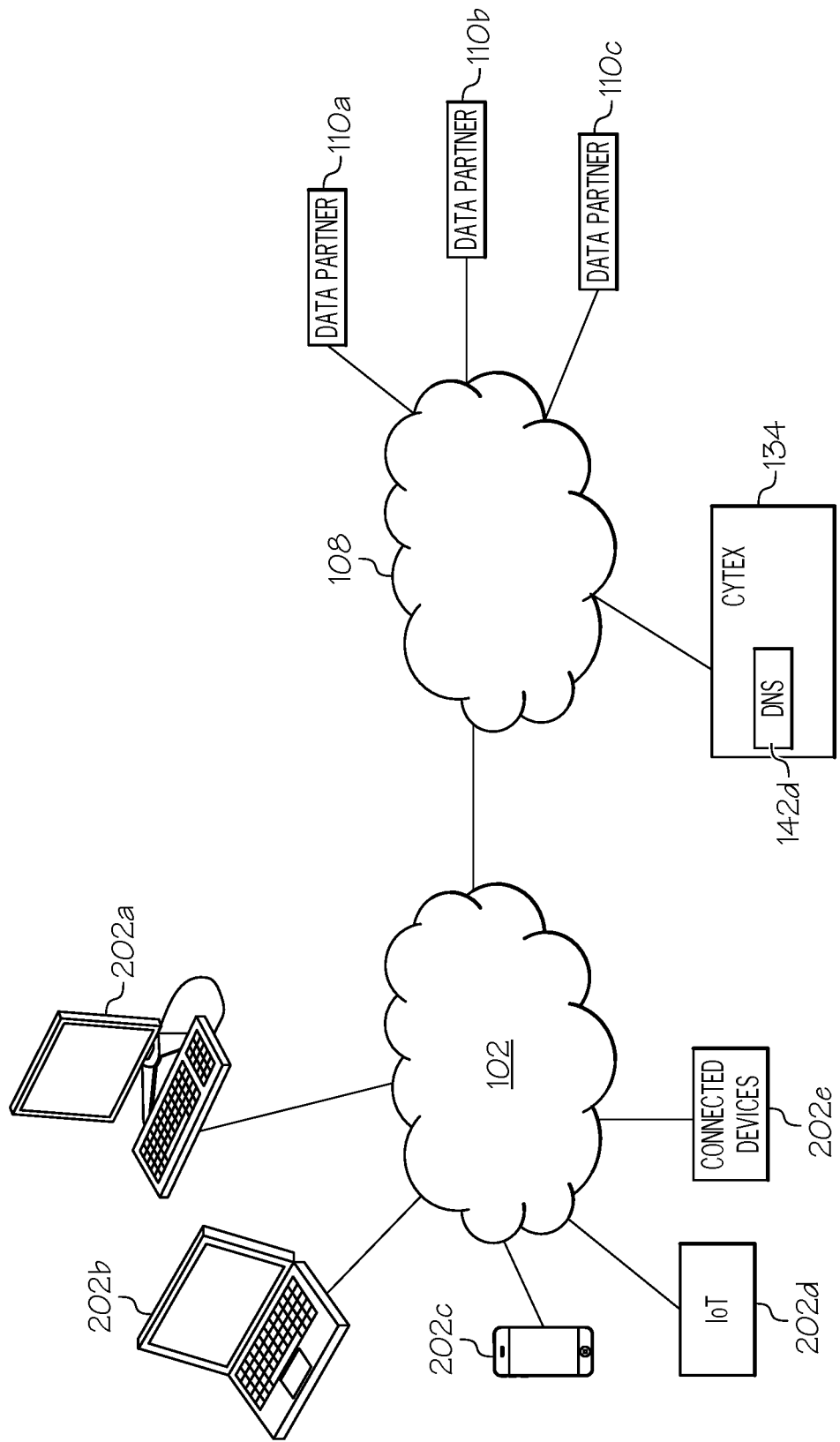
FIG. 2 illustrates a block diagram of additional features of a system for network communications, in accordance with another embodiment of the present disclosure.

FIG. 2 illustrates additional details regarding enterprise 102, its potential data partners 110a-c, and Cytex server 134. In the illustrated embodiment, enterprise 102 includes a plurality of connected devices 202a-202e. Such connected devices within enterprise 102 may include devices such as personal computers (202a), laptops (202b), mobile phones (202c), Internet of Things (IoT) devices 202d, and other connected devices 202e. Devices similar to 202a-e may also be employed within any of the other networks or data partners illustrated in FIG. 2.

The number and various types of communication devices used by an enterprise and its employees expose the enterprise to substantial vulnerabilities. Although devices 202a-e are illustrated as communicating through network 104 of enterprise 102, employee devices may be used to work from home, and mobile devices may be used to connect remotely with network 104 of enterprise 102. Thus, it is more and more critical to have a thorough understanding of the hardware and software used in the communication of data among enterprise 102, its employees, its data partners, third party network operators and services providers, and all of the devices and third parties that are involved in the data supply chain of enterprise 102. The hardware includes all hardware components deployed at the enterprise or data partner, including hardware specifications, specific models, and manufacturers of the hardware components.

The teachings of the present disclosure provide systems and methods for better understanding the entire communication infrastructure, in order to understand potential vulnerabilities. Also disclosed are systems and methods for better understanding the impact or implication of certain potential changes in hardware, software, policies, procedures and services employed by or for the enterprise. Also provided are systems and methods for anticipating certain stimuli that may impact the communication infrastructure by modelling and simulating network operations, without first exposing the network to potential vulnerabilities. All of the above can assist in decision making regarding potential changes, modifications, upgrades, improvements and the potential for exposure based upon same.

Cytex server 134 of FIG. 2 includes a domain name server (DNS) 142d within Cytex server 134. DNS 142d is used to convert a computer's host name into an IP address v4 (IPv4) and IP address v6 (IPv6) on the Internet. Thus, all communications over network 108 of FIG. 2 leverage DNS 142d to accomplish communications. Although FIG. 2 illustrates DNS 142d as part of Cytex server 134, any DNS server utilized by enterprise 102 may be located anywhere with network connectivity to network 108. For example, DNS 142d could be hosted by another third party or even within network 104 of enterprise 102. As will be described later in more detail, information exchanged with DNS 142d in the communication of data within the data supply chain of enterprise 102, can provide valuable insights into the number, type, identification, and resources employed by enterprise 102 and data partners 110a-c in the data supply chain of enterprise 102.

The teachings of this disclosure support any of the described systems and methods using a multitude of data connectivity protocols ranging from IPv4, IPv6, 4G, and/or 5G cellular connections. The systems and methods described herein can be accomplished regardless of communication source (computer, laptop, pad, smart phone, sensors, IoT transmitters, etc.).

Figure 3:
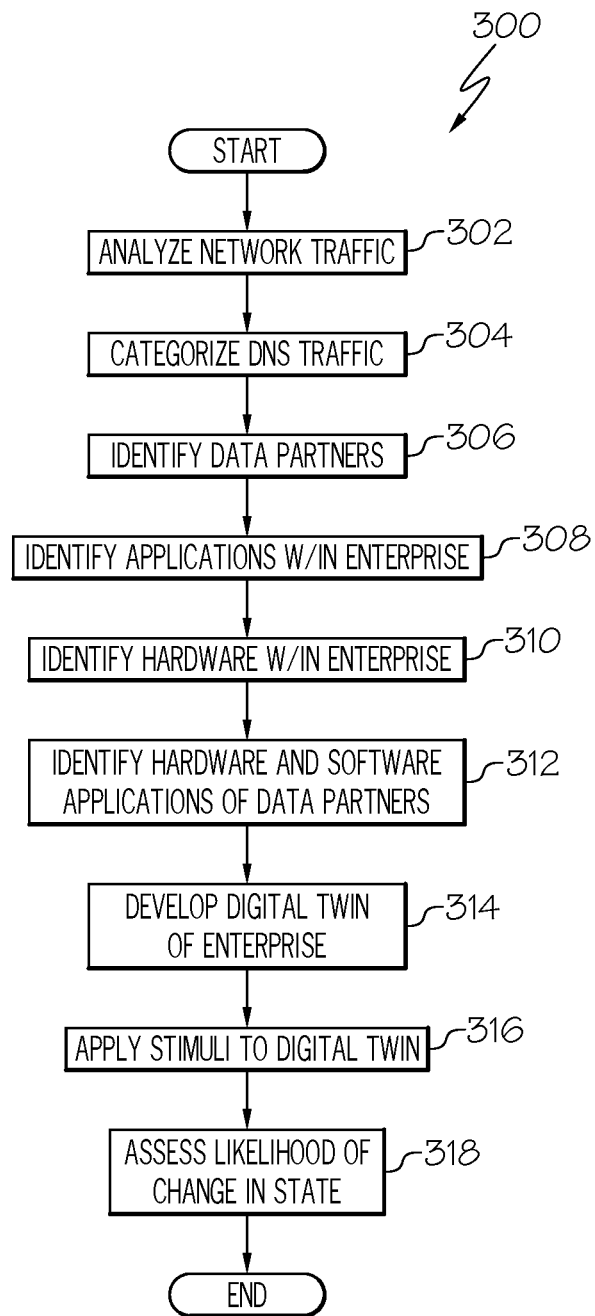
FIG. 3 illustrates a flowchart of a method for telemetry analysis of a digital twin, in accordance with another embodiment of the present disclosure.

FIG. 3 illustrates a method for advanced telemetry analysis of an enterprise digital twin, in accordance with a particular embodiment of the present disclosure. The method begins at step 302, where network traffic is analyzed. For example, network traffic into or out of network 104 may be monitored to determine information regarding potential data partners (e.g., 110a-c) that may be exchanging data with enterprise 102. In accordance with one embodiment, the network traffic may be analyzed at least in part using DNS 142d.

Utilizing DNS 142d to analyze network traffic is advantageous because it provides substantial insight into which entities are communicating with enterprise 102, how they are communicating (e.g., types of hardware and software applications) and what they are communicating. However, DNS 142d does not provide insight into the actual data being exchanged in the data supply chain. Most enterprises would not allow a third party to analyze all such data given its confidential nature. Moreover, analyzing all such data would be difficult due to its volume. However, analyzing network communications with DNS 142d ("DNS traffic") provides sufficient information to employ significant aspects of the teachings of the present disclosure.

In particular embodiments of the disclosure, the network traffic is analyzed using a dissection protocol. A dissection protocol can be employed to dissect Domain Name Server (DNS) queries and responses to ascertain certain information to help better understand what the DNS request was (e.g., resolution of an IP address, time update, status update, data refresh on domains (updated to nodes)) and to extract Domain Name Service (DNS) queries and responses. After this information is obtained, the DNS traffic can be categorized at step 304.

DNS queries resolution can be "successful" or "unsuccessful." An example of success is a mapping of a hostname to a valid IP address, where this information has been corroborated by other peer DNS servers. An example of an "unsuccessful" resolution is where the DNS query was malformed (packet format/layout was not presented in accordance with the DNS specifications) or a valid hostname to IP address mapping could not be performed (e.g., host doesn't exist). For successful queries, the hostname translation can be identified and categorized as, for example: (i) host name or IP address is not part of a malicious blacklist; (ii) organization owner of the host; or (iii) categorize traffic (see example categories below):

| | |
|---|---|
| Anonymizer | Sites that allow users to surf the Internet anonymously. |
| Command and Control & Botnet | Sites that are queried by compromised devices to exfiltrate information or potentially infect other devices in a network. |
| Cryptomining | Sites that mine cryptocurrency by taking over the user's computing resources. |
| DGA Domains | Domains detected as generated by algorithms seen in malware. |

-continued

| | |
|---|---|
| DNS Tunneling | Domains with detected DNS tunneling activity. |
| Malware | Sites hosting malicious content and other compromised websites. |
| New Domains | Domains that have been registered very recently. |
| Newly Seen Domains | Domains that have recently been resolved for the first time. |
| Phishing | Domains that are known for stealing personal information. |
| Spam | Sites that are known for targeting users with unwanted sweepstakes, surveys, and advertisements. |
| Spyware | Sites that are known to distribute or contain code that displays unwanted advertisements or that gathers user information without the user's knowledge. |
| Adult Themes | Sites that are hosting content related to pornography, nudity, sexuality, and other adult themes. |
| Business & Economy | Sites that are related to business, economy, finance, education, science and technology. |
| Deceptive Ads | Sites that spoof clicks, impressions, conversions for ads. |
| Drugs | Sites related to the use and promotion of illegal drugs or illegal use of prescribed drugs. |
| Education | Sites hosting educational content that are not included in other categories like Science, Technology or Educational institutions. |
| Entertainment | Sites that are hosting entertaining content that are not included in other categories like Comic books, Audio streaming, Video streaming etc. |
| Gambling | Sites that are providing online gambling or are related to gambling. |
| Government & Politics | Sites related to government and politics. |
| Health | Sites containing information about health and fitness. |
| Information Technology | Sites related to information technology. |
| Internet Communication | Sites hosting applications that are used for communication like chat, mail etc. |
| Job Search & Careers | Sites that facilitate searching for jobs and careers. |
| Login Screens | Sites hosting login screens that are not included in other categories. |
| Miscellaneous | Sites that are not included in the listed security and content categories. |
| Real Estate | Sites related to real estate. |
| Religion | Sites hosting content about religion, alternative religion, religious teachings, religious groups and spirituality. |
| Safe for Kids | Sites that are safe for kids to visit. |
| Security threats | Sites that contain security threats like malware, phishing, cryptomininng and other security threats. |
| Shopping & Auctions | Sites that are hosting content related to ecommerce, coupons, shopping, auctions and marketplaces. |
| Social & Family | Sites related to society and lifestyle. |
| Society & Lifestyle | Sites hosting information about lifestyle that are not included in other categories like fashion, food & drink etc. |
| Sports | Sites related to sports & recreation. |
| Technology | Sites hosting information about technology that are not included in the science category. |
| Travel | Sites that contain information about listings, reservations, services for travel. |
| Vehicles | Sites related vehicles, automobiles, including news, reviews, and other hobbyist information. |
| Violence | Sites hosting and/or promoting violent content. |

With information obtained at least in part from steps 302 and 304, a list of partners with whom enterprise 102 is exchanging data (data partners) is compiled at step 306. Many data partners can be identified by reviewing information exchanged with DNS 142*d*.

At step 308, applications that are internal to the enterprise and form any portion of the data supply chain are identified. These applications can be identified using information provided by the enterprise and its service providers, as well as information exchanges with DNS 142*d*. Any applications within the network that send or receive data to or from external resources should be included in this inventory/analysis.

It is also helpful to collect information regarding any hardware within the enterprise that is involved in the data supply chain, at step 310. Although the number and type of hardware devices involved can be substantial and diverse, the information should be readily available to the enterprise, since most or all of those devices are under the direction and control of the enterprise.

Next, at step 312, information regarding the hardware and software applications employed by data partners is collected. This information can be harder to collect and verify, since most or all of such hardware is under the direction and control of third parties. Thus, to some extent, an enterprise that wants to collect this information will need to rely upon the accuracy and completeness of the information provided by its data partners.

However, certain information regarding the software applications involved in the data supply chain can be obtained by analyzing the information exchanged with DNS 142*d*. For example, if an enterprise or data partner is using dropbox or skype, this can be determined using information obtained from DNS 142*d* (e.g., USING APIs and file extensions).

In alternative embodiments, data partners may agree to an audit in order to obtain a more accurate inventory of hardware and software applications included in the data supply chain of an enterprise. Data partners will often provide whatever information it has in its possession about its hardware and software applications. Data partners may also agree to perform an audit, allow a third party to conduct an audit of its resources, or participate in a mutual or collaborative audit. The inventory should include all hardware and software included in any hardware devices, computers, smart phones, IoT devices, medical devices, and any other connected device that is included in or has access to the data supply chain.

At step 314, a digital twin of the enterprise is developed. Digital twin refers to a model (e.g., computer readable, binary model) that is built using as much information as possible about the data supply chain of the enterprise. The digital twin, or model, allows simulation and testing to be performed without exposing the actual data supply chain of the enterprise to vulnerabilities or outages. The digital twin can be built by including as much information as is available regarding all of the applications used, hardware deployed, data exchange partners, and computer networks leveraged in the data supply chain of the enterprise 102, in the digital twin. While it will be difficult to have all of the information about all hardware and all software applications in the data supply chain, having a substantial amount of information will allow for an essential "replication" of the actual data supply chain in a simulation environment (e.g., digital twin model).

Much information can be obtained regarding potential vulnerabilities in the data supply chain, simply by identifying the hardware and software used by the enterprise and its data partners, in the data supply chain. For example, publicly available information can be used to identify previously identified vulnerabilities (e.g., public databases, public disclosures). Certain of the vendors, services (e.g., vulnerable services of applications) or applications may be associated with a previously disclosed Common Vulnerabilities and Exposure (CVE) matter and may already have a CVE number assigned to it.

Other publicly available information including information about discovered vulnerabilities may be obtained by periodically reviewing technical forums, and dark web disclosures. For example, reviewing the dark web may identify exploits to breach network or data security that are being described or even sold on the dark web. In accordance with particular embodiments, crawlers or automated processes may be employed to periodically review some or all of the publicly available information referred to above, to determine whether any new or previously undisclosed vulnerabilities have been identified with regard to any software applications, services, or organizations in the data supply chain.

In particular embodiments, the digital twin model will include an application model in which all software applications and related information are built into a binary machine readable model; a hardware model in which all of the hardware inventory is represented in a binary (digital) model for simulation; a supply chain model in which all of the data partners are represented in a binary model; a network model in which all of the egress and ingress network connections are modeled. The digital twin model, or simulation system can be built using the representations from each of these models. For example, the application, network, hardware, and supply chain models may be run against simulated inputs. The effects of the simulation may be modeled with Markov Chains and state transitions are noted. The transitions may then be compiled into a state-space model to calculate the organization's risk.

Having a digital twin provides the opportunity to apply stimuli to the digital twin, at step 316. For example, the digital twin provides the ability to simulate the risk to the enterprise by performing penetration testing on the digital twin. In certain embodiments, passive penetration tests can be run on data partners within the data supply chain.

At least two types of stimuli may be applied to the digital twin as part of, in addition to, or in lieu of penetration testing; the application of actual stimuli and/or the application of simulated stimuli. Actual stimuli applied to the digital twin refers to stimuli associated with "actual" changes that are planned or under consideration. For example, potential risks associated with changes to the network or newly identified information about the network by applying stimuli associated with such changes to the digital twin. Changes that can be included as stimuli to the digital twin may be associated with a new software application to be employed by the enterprise or a data partner. Another input may be a change in the security posture of a data partner. Alternatively, information regarding a new vulnerability (e.g., newly established CVE) identified in an installed software application may be applied as stimuli to the digital twin. Other stimuli may be associated with a vulnerability identified in the network defense systems and/or vulnerabilities in the hardware devices.

In a particular embodiment, such actual stimuli may applied to a Markov chain simulation to determine the likelihood that there will be a change in state. A Markov chain is a stochastic model describing a sequence of possible events in which the probability of each event depends only on the state attained in the previous event. In continuous-time, it is known as a Markov process. Markov chains are used to compute the probabilities of events occurring by viewing them as states transitioning into other states, or transitioning into the same state as before. Thus, if the enterprise is in a particular state, the Markov simulation can be used to determine the likelihood you'll end up in the next state, based upon the stimuli received.

Simulated stimuli are stimuli that are anticipated to be encountered in the data supply chain based upon simulations run upon the digital twin. In other words, simulations may be run that suggest certain stimuli will be encountered. Those stimuli may then be applied to the digital twin to determine the potential impact of those stimuli on the data supply chain of the enterprise. Simulated stimuli may be determined using Monte Carlo simulations. A Monte Carlo simulation is a model used to predict the probability of different outcomes when the intervention of random variables is present. Monte Carlo simulations help to explain the impact of risk and uncertainty in prediction and forecasting models. In general, the basis of a Monte Carlo simulation involves assigning multiple values to an uncertain variable to achieve multiple results and then averaging the results to obtain an estimate.

Thus, a Monte Carlo simulation may be used to determine a probabilistic state transition(s) (for example, there is a 40% chance that you will get to state 1, a 30% chance that you will transition to state 2 and a 15% chance that you will get to state 3). This is based upon the fact that in a Monte Carlo simulation, you are simulating the stimuli.

In a Markov simulation, either actual stimuli or simulated stimuli may be employed. Thus, a Markov simulation may be referred to as a deterministic state transition. In fact, feedback from the Monte Carlo simulation may be used to determine actual stimuli to apply in the Markov simulation. Thus, the above referenced techniques may be used to assess the likelihood of a change in state, at step 318.

Figure 4:
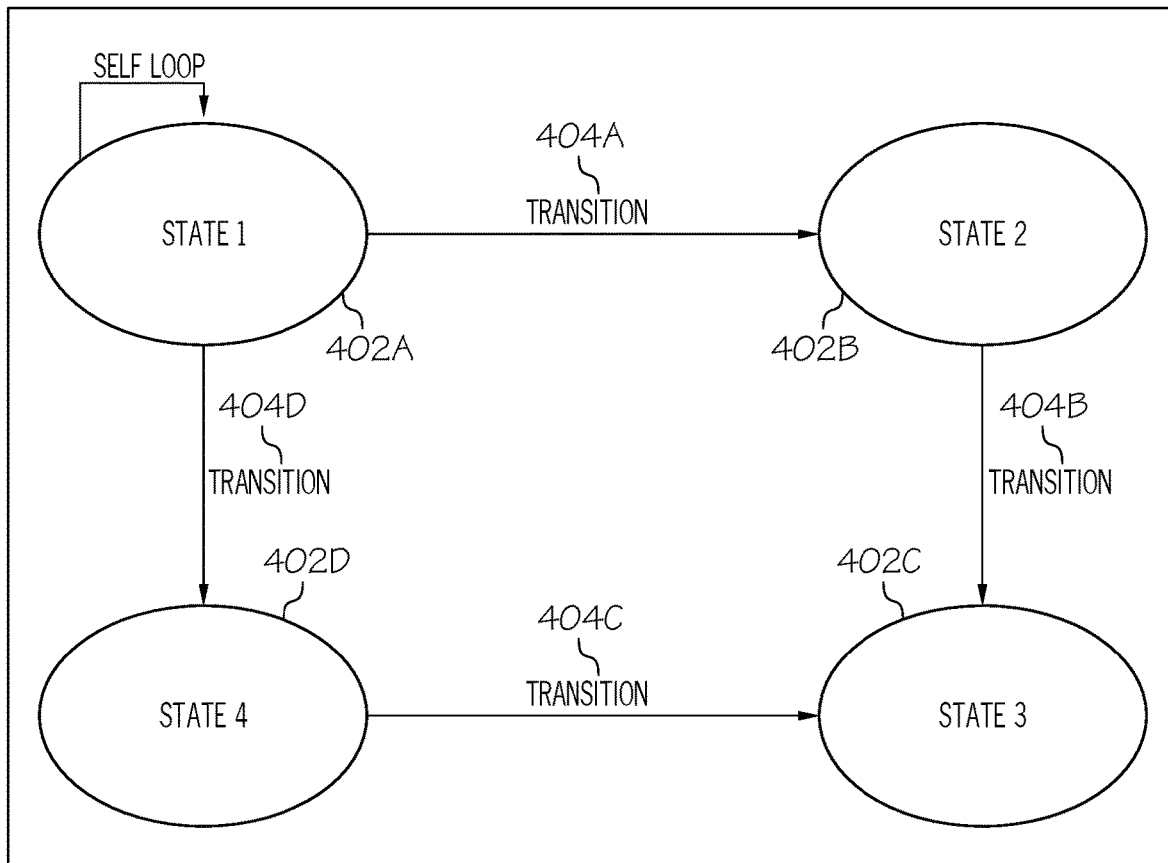
FIG. 4 is a state diagram, in accordance with another embodiment of the present disclosure.

FIG. 4 illustrates an example of a simulation model (using simulated and/or actual stimuli) that may be used for state-space transitions using Markov chains. The components are state representations 402a-d depicting steady states. Transitions 404a-d reflect the probability of transition from one state to the other. A self-loop 406 indicates that there is no change in the state and the current state is maintained even with an external input.

The systems and methods of the present disclosure, after building a simulated model (e.g., digital twin) of the enterprise, simulate the affects that a change in any of the system application would have on the overall operations of the enterprise, including a change in the cybersecurity posture of the enterprise. The model and simulation can be updated as additional information is obtained about the hardware and software used in a data supply chain. For example, as discussed above, periodic and automated review and analysis regarding publicly available information can be configured and assigned. When new information becomes available through one of the public sources referred to above, the information can automatically be incorporated into the model and simulation.

A recent example includes the identification of a vulnerability of the application log 4j. If an initial model and simulation were performed before the identification of the log 4j vulnerability, then the model would not take into account this significant vulnerability. However, if and when this vulnerability was identified and made available to the public (e.g., through news outlets, technical forums, gov't websites, etc) the teachings of the present disclosure provide a method to automatically identify the vulnerability, and incorporate the new vulnerability into a simulation of the model, to determine the potential impact.

The building of a digital twin model and simulations discussed above can be used to provide risk scoring and trust scoring with regard to a particular data partner, application, hardware configuration or service. Moreover, the results can be used to suggest remedial action for each category of identified risk, to reduce the risk impact. In some cases, the remedial action may be available through public sources (for example, in a CVE) and the teachings of the present disclosure may be used to identify the risk, and provide a mapping from the identified risk to any public disclosure associated with the risk, and recommended remediation if one exists.

The teachings above can be used establish and update the risk and trust scoring of a particular vendor. For example, the cyber "posture" of a vendor or service could change with any change in configuration, applications used, service providers used. For example, if a particular vendor decides to "turn off" multi-system authentication, that would result in a change in the results of the simulation and likely increase the risk profile of the vendor.

Thus, using a multitude of system inputs, the simulated model will predict the changes and notify the enterprise about the changes to allow the enterprise to assess the impact of external changes, respond to the external changes, plan for the changes, and remediate any threats or vulnerabilities that may arise from the changes. This information, when processed in a timely manner, would help business enterprises stay informed about the latent changes in their data supply chain and respond to changes quickly to maintain their competitive advantage.

The teachings of the present disclosure help to identify business risks that are present within the internal business enterprise as well as externally. A business needs to be cognizant of all the vulnerabilities that are present and may be introduced through vendor risks, outdated products, weak security postures of a vendor, or a newly discovered vulnerability in an application. The teachings herein help to identify these risks to better prepare a business enterprise to gain visibility into its data supply chain, assess the risks, plan for risk mitigation, and security vulnerability remediation. This will allow business enterprises of all sizes to improve the security posture of its business, improve the business resilience, and mitigate risks, thereby, improving the business resilience of the business enterprise.

As discussed above, the teachings herein leverage techniques from data risk management, security vulnerability assessment, and network monitoring techniques. The teachings build upon statistical modeling techniques including Markov Chains, Monte Carlo, and Geometric Brownian Motion.

Brownian motion is a strictly Markov process, which implies that any states generated are dependent on the last state. Mathematically, GBM can be represented as:

$$S(t) = S_0 * e^{X(t)}$$

where $X(t) = \sigma B(t) + \mu t$.

GBM motion is used to generate a variety of next states in the Monte Carlo simulation by varying the time and variance variables. Once these candidate inputs are generated, the outliers are filtered out and a reasonable fit is selected to emulate the state of the system.

Once deployed, the teachings of the present invention may be used to automatically build an inventory of the data partners, compute individual risk scores for all the data partners, and then simulate a variable risk scenario plan for an organization. In the past, inventory of data partners, computation of the risk scores, identification of a model for risk, and then simulation using the selected model would have to be performed separately.

The teachings of the present disclosure may be used by organizations to simulate their cybersecurity risk through a digital twin model. The teachings may also be used by auditors to assess the risk of an organization to ensure compliance with a government mandate or by insurance companies to underwrite the insurance policies. Moreover, since the simulated attacks are performed against the digital twin, the risk of an outage is minimized, which makes the teachings of the present disclosure much less intrusive to the operations of the enterprise.

Another method for assessing risk is through the use of geomapping of actual communications or for use in the simulated model. Geomapping is a way to identify where certain data is going using geolocation (e.g., API call or FTP you know where the endpoint is). Thus, when the destination of the data is determined (e.g., the IP address), the location of the data destination can be looked up on a geomap (e.g., reverse lookup) by comparing information from the API call, FTP, or IP address to a database (reverse lookup) that identifies the associated physical location (geographic location). For example, a database that maps different APIs to specific geographic coordinates can be purchased from a third party and used for this purpose.

FIG. 5 illustrates a method for addressing risk within the data supply chain of an enterprise. The method begins at step 502 where a plurality of data partners within the data supply chain are identified. As discussed above this information can be compiled from a number of sources. For example, much of the information is likely to be in the possession of the enterprise itself, since it will likely know much, but not everything, about its data supply chain. Additional information regarding the data supply chain can be obtained by analyzing network traffic (e.g., through a DNS). Other information may be obtained through publicly available sources.

Next, at step 504, network security vulnerabilities on the data partner's network are evaluated. Security vulnerabilities may also be determined using several different sources and methods. For example, some vulnerabilities will be identifiable through public disclosures (e.g., made by the data partner or otherwise). As another example, the data partner and/or the resources the data partner employs may be the subject of a CVE that becomes public. Vulnerabilities may also be identified by reviewing any transaction or storage cookies found (e.g., through DNS). In accordance with a particular embodiment of the present disclosure, information regarding such risks and how they were determined may be provided to the enterprise in an easy to understand graphical format, see for example FIG. 5B, which illustrates vendor impact for each vendor (or application listed) along a risk/impact graph. It also illustrates that 44.6 of the vendors for this enterprise fall into a high vulnerability rating (as opposed to medium or low vulnerability) and a pie chart illustrating how many vendors have high, medium or low "trust scores" determined from a risk algorithm.

Figure 5A:
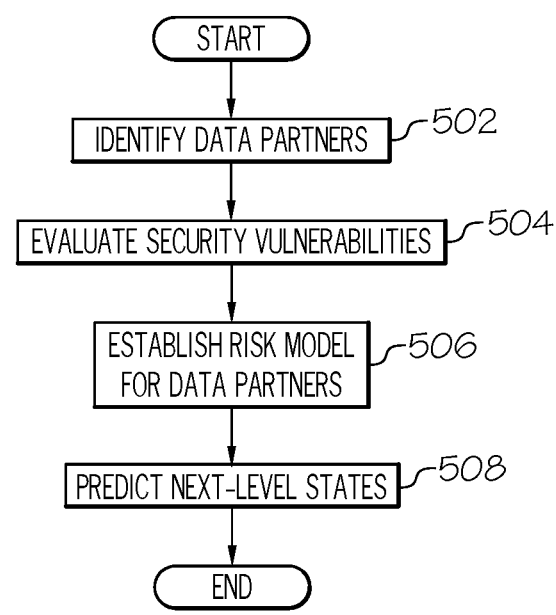
FIG. 5A illustrates a flowchart of predicting states, in accordance with another embodiment of the present disclosure.
Figure 5B:
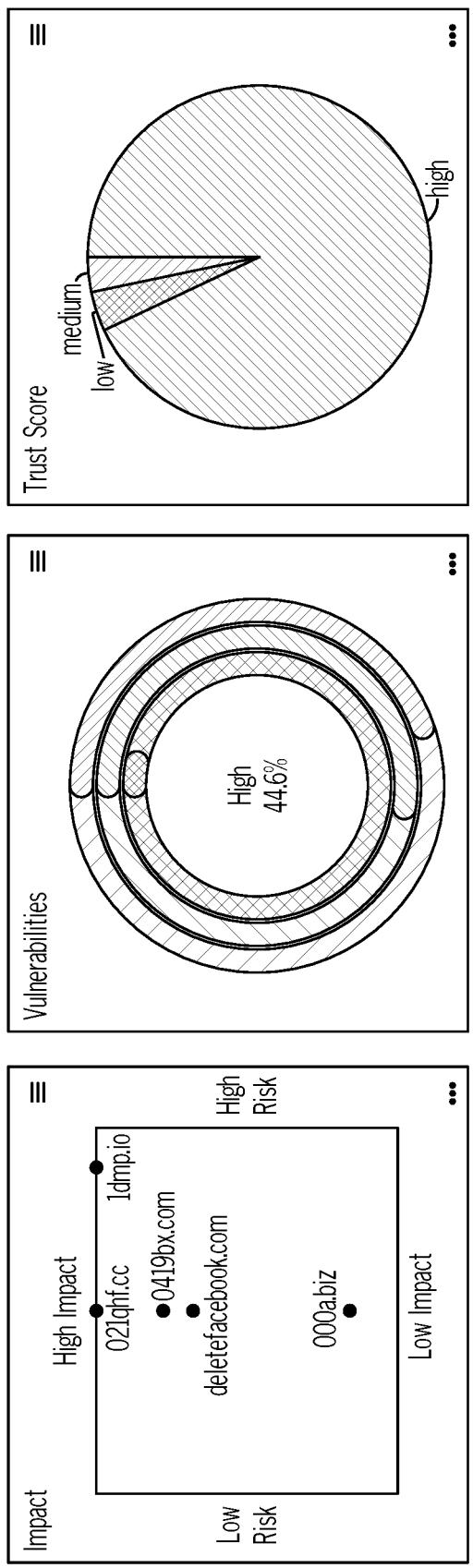
FIG. 5B illustrates a GUI graphical display, in accordance with another embodiment of the present disclosure.
Figure 5C:
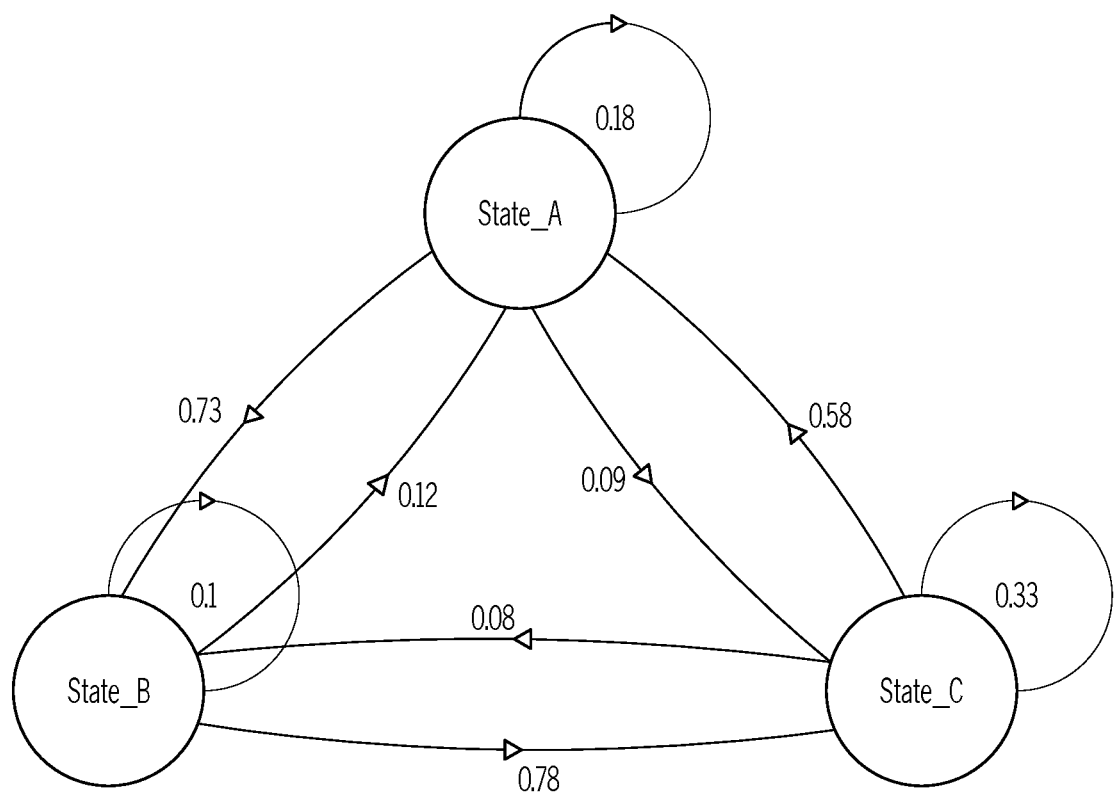
FIG. 5C illustrates a display of state change predictions, in accordance with another embodiment of the present disclosure.
Figure 5D:
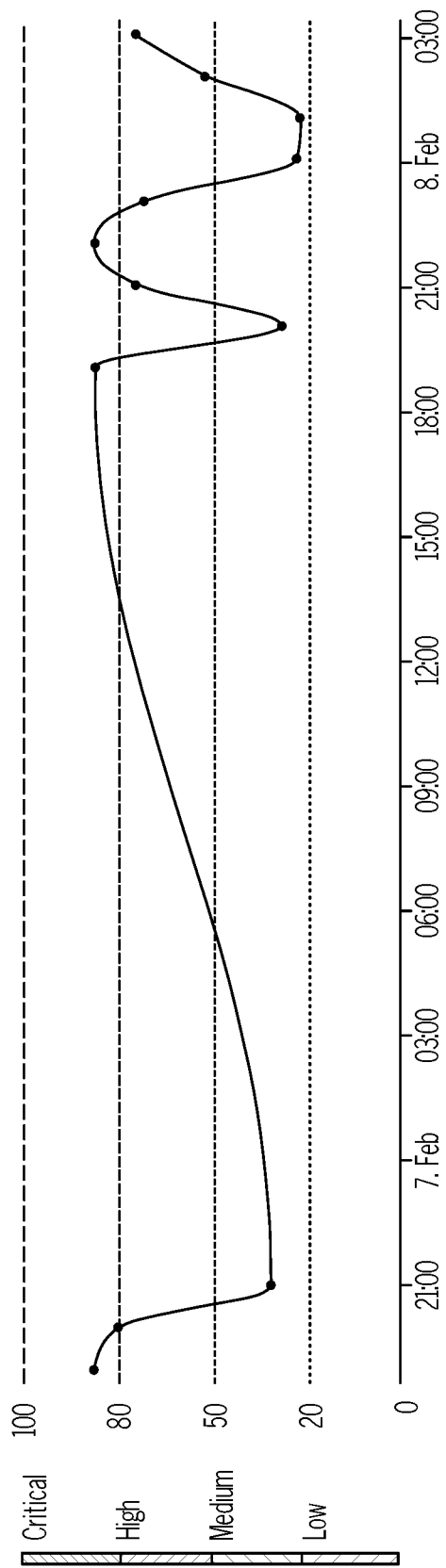
FIG. 5D illustrates a display of the overall risk of an enterprise over time.

Using this information, and other information determined from the analysis of the digital twin, a risk model for each data partner can be established at step 506. Moreover, Monte Carlo and Markov Chain modelling can be used according to the techniques described herein, to simulate the next level states at step 508. The next level states can then be provided to the enterprise in an easy to understand and navigate user interface, for example the Markov model of FIG. 5C which illustrates the likelihood of a state change (e.g., 0.73 chance of changing from State A to State B, 0.12 chance of changing from State B to State A, and 0.18 chance of remaining in State A). This allows the data partners to be categorized into high, medium and low risk categories, at step 510. FIG. 5D illustrates the overall risk of the enterprise over time.

It is also incumbent upon any enterprise that acquires potentially sensitive data to keep track of how its data partners are using the data, routinely audit the data usage practices of the data partners and take action as necessary if a data partner changes its data usage policy. The data usage policy of an enterprise is usually described and disclosed through a "Privacy Policy" and "Terms of Use". These data usage policies of an enterprise or data partner are typically made publicly available through a website associated with the enterprise or data partner.

It is a difficult and time-consuming task to keep an accurate inventory of all data disclosures to an entity's data partners. With many applications hosted in the cloud, and due to the number of communications directly from computers, smartphones, database systems, and other connected devices, it is difficult to catalogue all data partners and data disclosures. Once the data partners and the respective data streams associated with the data partner are inventoried, there is still a need to understand and keep track of how the data is potentially being used by the data partners. Moreover, any subsequent changes to this data usage policy must be audited to understand whether any adjustments to the data supply chain associated with the data partner should be implemented.

Data partners are expected to signal any changes to their data storage or data usage policy through their "Terms of Use" or "Privacy Policy" documents that are publicly available. The teachings of the present disclosure provide an automated system and method for identifying all data partners, tracking the data usage policies of such data partners, and monitoring and detecting any changes to such data partners data usage policies.

Figure 6A:
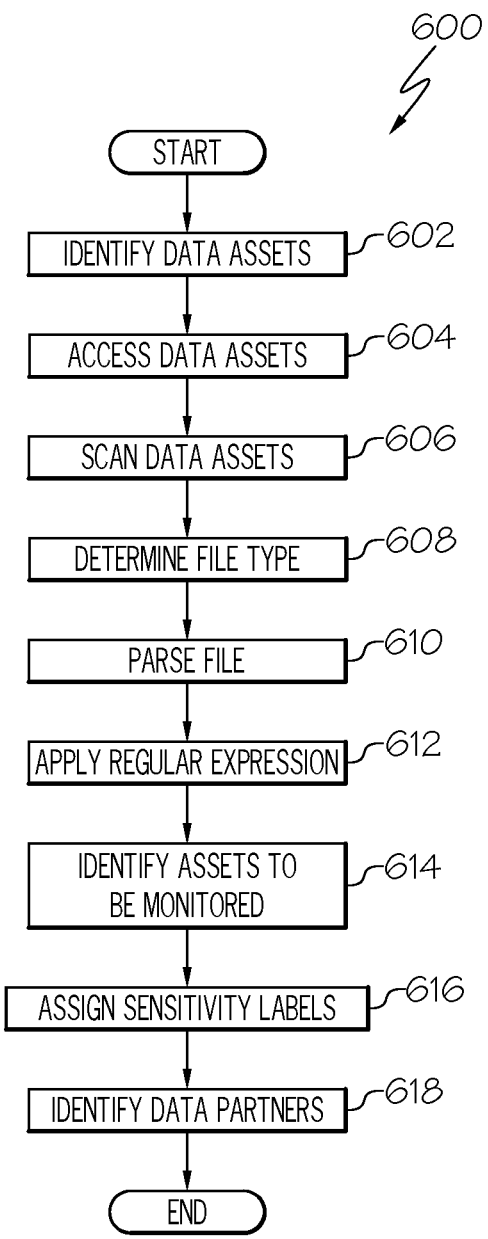
FIG. 6A illustrates a flowchart of monitoring data assets, in accordance with another embodiment of the present disclosure.

FIG. 6 illustrates a method of monitoring data disclosures 600, in accordance with a particular embodiment of the present disclosure. The method begins at step 602 where data assets of the enterprise are identified. The teachings disclosed herein could be used to review and analyze all data that is stored, transmitted or received by the enterprise. However, it is likely that an enterprise will be particularly interested in a specific subset of data where it is likely that sensitive data files may exist, and less apt to allow full access to all of its data assets to a third party provider of the products and services described herein. Thus, the enterprise may provide a particular identification of data to be analyzed (e.g. storage systems or locations), or may seek to have all of its available data analyzed.

The data of the enterprise may be stored locally, or at geographically diverse locations associated with the enterprise (e.g., offices throughout the world). The data may also be stored by a host in the cloud (e.g., AWS, Google Cloud and Azure). Alternatively, the data may be stored by a third-party using storage systems and networks private to or under the control of the third party. Given the diversity of data, identifying all of the data stored within the enterprise (e.g., storage systems and private networks under the control of the enterprise), hosted on behalf of the enterprise and at least partially under the control of the enterprise (e.g., cloud—AWS, Azure, Google Cloud, or shared drive—Dropbox, Google Drive, Amazon S3, Slack, Onedrive, Office 365, etc.), or stored by a third party or data partner, can be challenging.

For purposes of this disclosure, sensitive data refers to data that includes certain aspects or information that should be monitored. For example, data may include confidential information of the enterprise, or data that needs to be monitored and/or controlled for compliance purposes. Such data may be subject to regulatory control or third-party certification for protection. Examples of the regulatory regimes that regulate this type of information is provided above. For example, any information stored by or on behalf of the enterprise that includes personal health information (PHI), personally identifiable information (PII), ICD-9 codes, ICD-10 codes, Medical Record Number (MRN), driver's license information, credit card data, or social security numbers or information, to name only a few, may be identified as potentially sensitive in order to be tracked in accordance with the teachings of the present invention. Such data may be the subject of a regulatory regime or compliance obligation. Other potentially sensitive data may be confidential to the enterprise, for example, trade secrets or secure keys associated with data stored using AWS or Azure.

Next, at step 604, access to the data assets (e.g., stored files) is obtained. For example, access to the data assets may be obtained using an application programming interface (API). At step 606, the data identified by the enterprise (e.g., all of its data, or only specific storage locations identified in advance by the enterprise) is scanned. In particular embodiments, such scanning takes place while the data is "at rest" (e.g., stored, not in transmission). Scanning of the data is accomplished to look for potentially sensitive information. For example, all files and databases (e.g., MongoDB) are scanned and the data reviewed to identify the potentially sensitive information.

Scanning of the data allows for the identification and collection of certain information about the data. For example, information within the file may indicate the file type of the file (e.g., .pdf, .doc, .xls, etc.), for example a string of text within the file may identify the specific application. Thus, at step 608, a particular file(s) may be analyzed to determine the file type based upon information contained within the file. Scanning of the files and/or determining the specific file type can also allow for the file to be parsed at step 610, to determine whether any potentially sensitive data is stored in the file. In particular embodiments, parsing the file may include applying a regular expression to the file (e.g., FIG. 6B), at step 612. FIG. 6B illustrates the regular expression, what it is used to search for (e.g., American Express Card REGEX), and allows a user to add or delete (by clicking the "x") expressions from the data analysis for the particular enterprise.

Each file that is identified as having potentially sensitive data is identified at step 614. Files that include potentially sensitive information are also assigned sensitivity labels at 616. Sensitivity labels may be a high level "rank" of how sensitive the data is, to be able to track and assign access to the data based upon its sensitivity rank. This may be a numerical score (e.g., 1-10 scale) or it may simply be identified as low, medium or high.

The sensitivity labels may also specify the type of sensitive data. For example, files containing PI may be assigned sensitivity labels indicating that the file includes PI. The same can be done for PHI, credit card information, trade secrets, etc. This allows for a dataset to be prepared that correlates the type of sensitive data to the file.

At step 618, data partners of the enterprise are identified. Data partners may be identified in a number of different ways. For example, certain information embedded in the data of the file may identify a particular data partner. In particular embodiments, the teachings disclosed herein may be used to ascertain if there is sensitive data being sent by looking at the source and destination. For example, if data is being sent from a host to a financial institution, it may be assumed to include financial information. More commonly, data partners are identified as those entities having access to or authorization to access the file.

Restrictions on access to files are common, and a "white list" of persons or entities that can access the file may be generated. Persons or entities with access may be "internal" to the enterprise (employees or persons with network credentials associated with the private network of the enterprise) or may be external (individuals, consultants, or third party companies in the data supply chain of the enterprise). For the reasons discussed above, a full understanding of the data supply chain of the enterprise, all data supply partners, and all entities with access to sensitive data of the enterprise can be essential to fully protecting the data of the enterprise and complying with some or all regulatory regimes that may apply to the enterprise generally or the specific type of data in particular files or storage locations. After the data partners of the enterprise that are associated with any potentially sensitive data are identified, they can be analyzed to confirm that they are good stewards of the data, as described in more detail below.

Figure 7A:
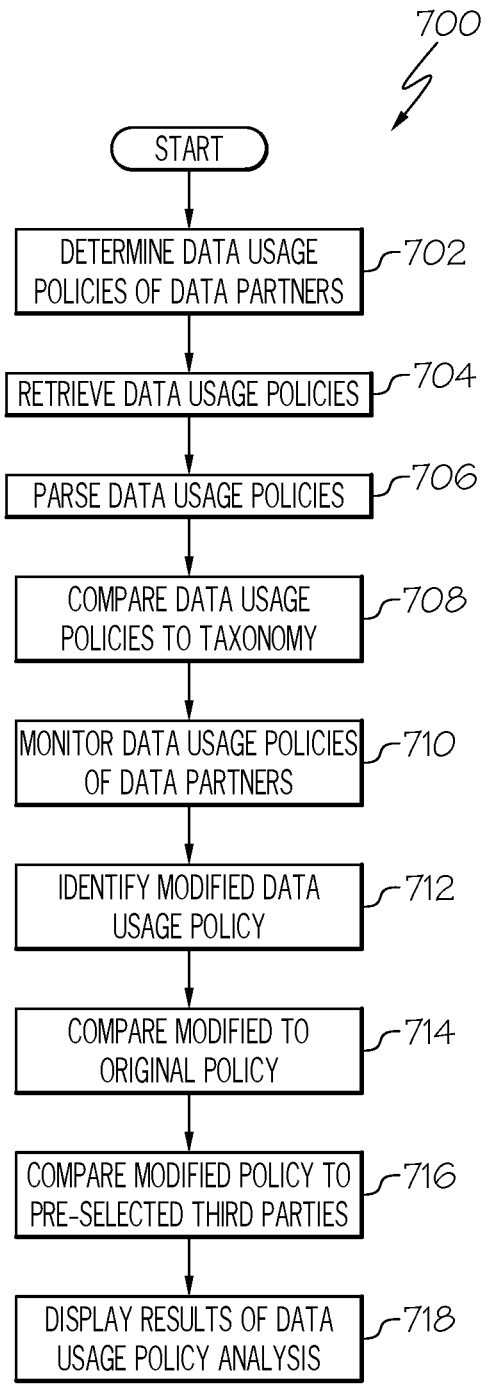
FIG. 7A illustrates a flowchart of monitoring data assets, in accordance with another embodiment of the present disclosure.

FIG. 7 illustrates a method for semantic analysis of data usage policies of data partners 700, in accordance with another aspect of the present disclosure. The method begins at step 702 where the data usage polices of data partners are identified. Typically, data usage policies of an organization will include a "Terms of Use" and a "Privacy Policy", each of which are usually available to the public through a website associated with the organization. For example, privacy regulations now require most organizations to disclose what data is collected and the intended purpose of the collection, and this is typically made available to the public through a website. Thus, determining data usage policies of the data partners may include retrieving the data usage policies of the data partners using a data transfer method built upon HTTP, HTTPS, or Web Services, at step 704. The extracted data usage policy documents from different data partner sites are collected, data is cleansed, and normalized for further processing.

After the data usage policy(s) is obtained, the retrieved documents are then processed and parsed at step 706 to extract the semantic content in order to allow for further analysis of the policy. This may include employing a natural language processor built using machine learning code to analyze and parse the content of the normalized privacy policy documents. This allows for the data usage policy to be compared to a domain specific taxonomy (e.g., topic map) for a generic data usage policy at step 708 to assess how comprehensive the data usage policy is, and to confirm that the data usage policy at least addresses those topics most commonly covered by specific data usage policies. Thus, after natural language processing, the salient document concepts pertaining to the compliance and policy are extracted and mapped to a machine-readable representation.

The domain specific taxonomy may be developed by using machine learning to review and analyze hundreds of preselected data usage policies of various organizations, to identify the most common topics addressed. For example, the preselected data usage policies of various organizations include organizations large, medium and small, public and private, for-profit and not for-profit are included in the analysis to ensure a representative sample. An example of the topics derived from the taxonomy are available at FIGS. 7B and 7C. 7B illustrates the most common topics derived from the analysis of the hundreds of preselected organizations, in an attempt to capture the most common "topics" addressed by the most organizations. In addition, FIG. 7C includes text that would be used for the enterprise if they applied the topic map (e.g., "Because Pinterest is a worldwide service . . . ").

At step 710, the data usage policies of the data partners are monitored. This can be configured to be accomplished automatically, at predetermined time intervals. For example, a web crawler process that periodically visits an organization's website and extracts the privacy policy for further review may be employed as part of the monitoring. Monitoring can be done by periodically scraping the website of the data partner to obtain its data usage policies in a similar manner to that described above (using a data transfer method built upon HTTP, HTTPS, or Web Services).

Next, at step 712, a modified data usage policy is identified. The modified policy may be identified by comparing the original policy to the most recently obtained (scraped data usage policy) to determine whether there are any differences, at step 714. In particular embodiments, comparing the original version to the changed version may be accomplished using Euclidean, Jaccard or Cosine similarity metrics. These metrics allow for an analysis of the "overlap" (or lack thereof) of the two policies.

The modified data usage policy may also be compared to the taxonomy. For example, in accordance with particular embodiments, a semantic relationship between the changed or modified version of the data usage policy and the generic data usage policy may be built using a modified Latent Dirichlet Allocation and the results displayed on a graphical user interface.

At step 716, the modified data usage policy may be compared to several data usage policies of pre-selected third parties. For example, the third parties may be selected because it is expected that their data usage policies are best in breed, or that the third parties have much goodwill associated with their names leading the general public to believe that their policies are among the strongest or most appropriate in their industry. Technology leaders may be chosen (Apple, Microsoft, Google, IBM, Amazon) for comparison to the data usage policies of a technology company. However, third parties in other industries may be selected if the "target" data usage policy to be compared is in a different industry (e.g., healthcare, pharmaceutical, consumer goods, etc.).

This comparison may include the computation of a pairwise similarity index between the modified version of the data usage policy and the pre-selected set of publicly available data usage policies. Moreover, the results of the computed pairwise similarity index may be displayed, for example, at a graphical user interface.

At step 718, results of the data usage policy analysis may be displayed. For example the results of the comparison of the original data usage policy (and/or a modified version of the original data usage policy) to the taxonomy may be displayed to the enterprise, in a graphical image that allows for easy comparison. Similarly, the results of the comparison between the original data usage policy and the modified data usage policy may be displayed. Moreover, the results of the analysis of the modified data usage policy (and/or the original data usage policy) to the pre-selected policies of certain third parties may be displayed to provide a snapshot comparison of the modified policy, the entities that may be considered best of breed. An example is provided at FIG. 7D that illustrates the comparison to different preselected parties, and a similarity index (derived from the cosine similarity algorithm). A similar comparison can be provided to illustrate the similarity of the original policy to the modified policy, or to the taxonomy generally (e.g., illustrate which topics are addressed by the modified policy (or the original policy)).

The output may also be converted from the concepts/topic mapping and checked against a system of business rules to validate compliance and/or best practices are being employed by the enterprise. Moreover, post concept extraction, the concepts are converted from a machine-readable representation to a human readable representation for a reviewer to understand.

Teachings of the present disclosure may also be applied to stored source code (in lieu of, or in addition to the files or databases referred to above) of the enterprise (e.g., a source code stack) to scan, parse and identify potentially sensitive data within the source code. Such data could be provided to a third party or used in violation of a regulatory regime if the enterprise is not aware that the potentially sensitive data is stored within the source code.

Moreover, these teachings could also be used to analyze source code (e.g., source code stack) of the organization to identify vulnerabilities (e.g., unsafe assertions included in the source code stack), for example assertions causing an intentional buffer overflow. In particular embodiments, this type of scanning and parsing can be used to find unsafe assertions embedded in the source code by a trusted, or internal saboteur.

The teachings of this disclosure include systems and methods that automate the identification and tracking of how data is being used by an entity's data partners by analyzing the privacy policy and terms of use documents using a semantic interpretability algorithm. The teachings also include systems and methods to detect any changes to the data usage and terms of use documents by routinely scanning the publicly available documents and notifying the enterprise of any semantic changes to its data partners data usage policies. This enables the enterprise to invite its data partners to participate in an audit using the integrated platform.

The teachings herein also combine and extend techniques including extracting topic maps from a text document, retrieving documents using network data protocols, and parsing of documents from different text formats. Prior techniques would likely have had to rely on syntactic comparisons between different versions of a document to understand whether the two documents were different. This would lead to many "false positives" (falsely suggesting a meaningful change) since any trivial syntactic change, such as a new line of text, extraneous spaces or extra characters would lead one to believe that two versions of the document are materially different.

An unauthorized data disclosure that results from a malicious attack, insider threat, or a misconfigured computer system often results in devastating consequences. Timely discovery is vital to limit the damage caused by the disclosure of critical information. In order to prevent unauthorized information disclosure and ensure regulatory compliance, it is imperative to inventory the data sources that are receiving information from an enterprise. However, it is becoming increasingly difficult to get a comprehensive inventory of data sources due to the multitude of computers, Internet of Thing (IoT) devices, databases, smart phones, tablets, and other connected computing devices that communicate with other servers hosted outside of an enterprise's network.

Performing a comprehensive audit to identify the destination of all data sent to and from an organization is a tedious process. Some information can be obtained from log files within a DNS server, but this is mostly limited to information at the IP address level. A reasonable amount of effort has to be expended to translate the IP information obtained from the DNS server to meaningful human readable names. However, this information is untrustworthy because a receiving party's name could be registered with a domain name registrar by a malicious actor. Thus, it is beneficial to cross-validate this information with a trusted third party that can vouch for the identity of the receiving entity.

The teachings of the present disclosure allow for the creation of a reliable inventory of outgoing data destinations. Those data destinations can be cross-validated to determine the identity of the receiving entity. This is done using an automated process at or close to "real-time". Any impersonators that could be masquerading as a legitimate receiving entity can be flagged and identified to the enterprise. In particular embodiments, the geographic locations associated with the data destinations (where the data is being sent) can be identified in order to confirm that the recipient is legitimate (e.g., location where data being sent is consistent with expected geographic location of the alleged recipient).

The inventory of outgoing data destinations can be automatically updated, as outgoing data destinations and data exchange partners change over time, using the information obtained from the DNS server. Moreover, the inventory of outgoing data destinations may include a multitude of sources.

Figure 8A:
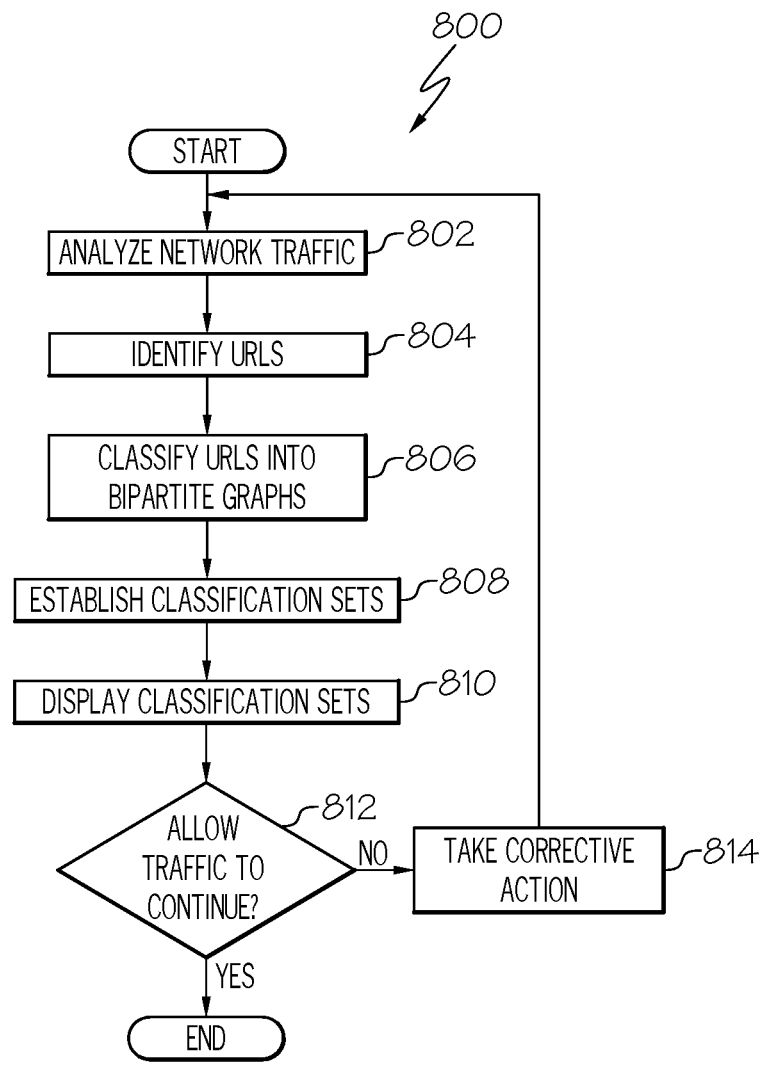
FIG. 8A illustrates a flowchart of network communication analysis, in accordance with another embodiment of the present disclosure.

FIG. 8 illustrates a method for monitoring data traffic, in accordance with a particular embodiment of the present disclosure. The method begins at step 802 where network traffic of an enterprise is monitored and analyzed. In particular embodiments, an automated inventory of all data exchanges may be created by observing the IP traffic, DNS protocol traffic, and URL traffic, in each case both transmitted from and/or received by the enterprise. At step 804, URLs included in the network traffic are identified.

Figure 8B:
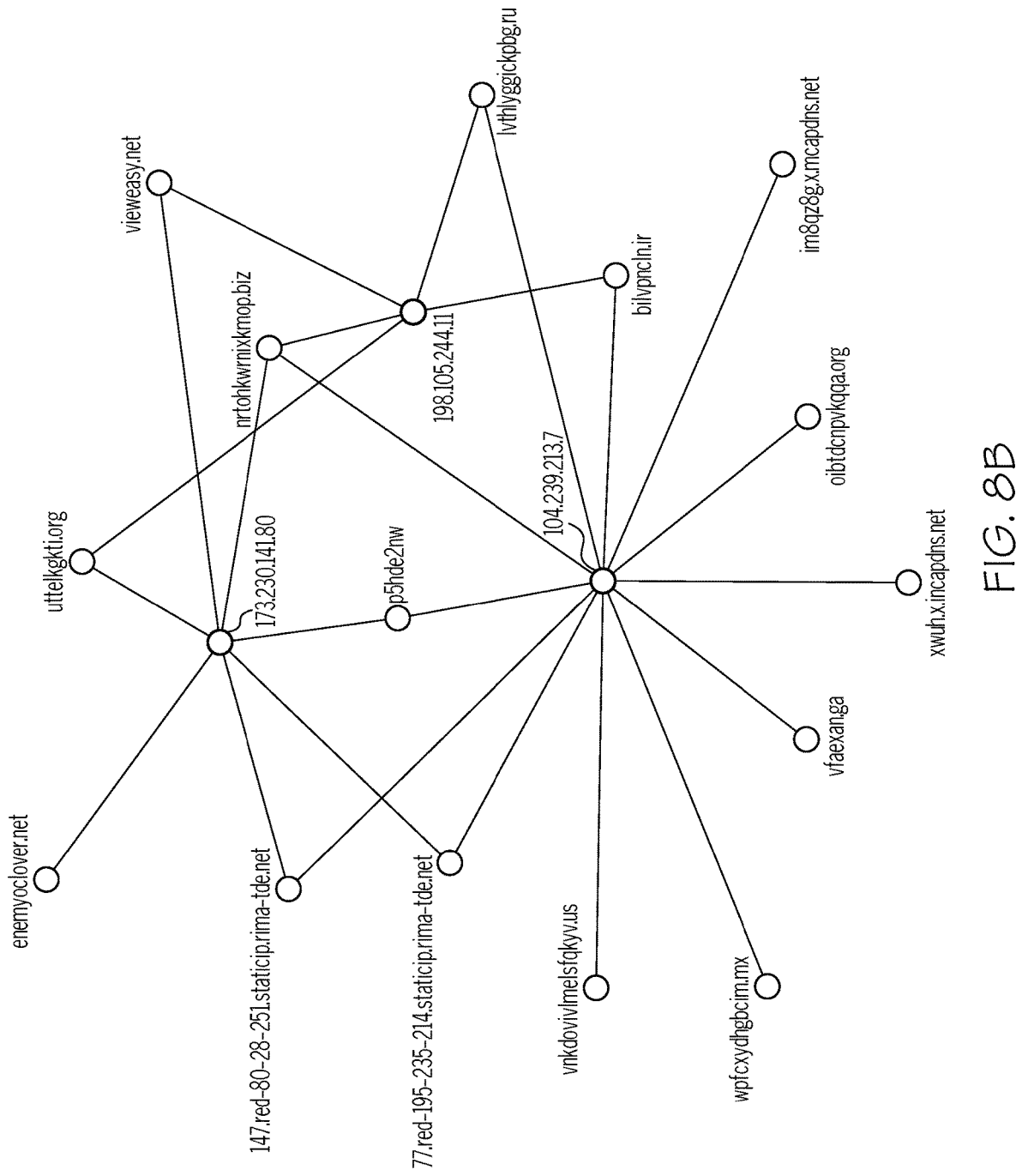
FIG. 8B illustrates a bipartite graph, in accordance with another embodiment of the present disclosure.

Next, at step 806, the URLs are classified into a set of bipartite graphs. This can be accomplished by using a machine learning algorithm that reviews and analyzes the traffic. This information and the bipartite graphs may be further used to establish classification sets at step 808. The bipartite graphs and/or classification sets may be displayed (e.g., at a GUI) at step 810, or otherwise made available to users to help aid policy making decisions with respect to particular data destinations. An example of a simple bipartite graph is illustrated in FIG. 8B for illustrative purposes, but would typically include hundreds or thousands of data points. In order for a user to understand, the classification set would display a block chart illustrating how many domain names are associated with each IP address to allow a user to readily spot a potential bad actor using multiple domain names from a single IP address. This information is helpful to the user to identify potentially malicious data streams, data destinations, and/or third parties.

Bipartite graphs can be particularly helpful to identify potentially malicious actors. For example, malicious actors often register many different websites, but are only able to use a limited number of IP addresses. The use of bipartite graphs in the manner described herein allows a graphical representation to illustrate the correlation between multiple websites and very few IP addresses. Thus, a visual that illustrates that many different domain names (dozens or even hundreds) are associated with one, or very few, IP addresses, will highlight a potential malicious actor(s). Moreover, even if there are a few IP addresses with which many or all of the domain names are associated, geomapping may be used to determine if the IP addresses are related, for example in the same geographic location.

At step 812, the user is given the option to allow data traffic to continue. If the classification sets don't suggest any potential problematic issues with the network traffic and communications, the process may end. Alternatively, if the classification sets suggest potential problematic issues with the network traffic and communications, the system may automatically, or provide the opportunity for the user to, take corrective action at step 814.

Corrective actions may take many forms, in accordance with the teachings of the present disclosure. In extreme examples, corrective action may include shutting down outgoing network traffic, or all network traffic. More commonly, corrective action may be targeted to a particular address or data stream. For example, all traffic associated with a particular URL may be more closely monitored, slowed or shut off completely. The same action may be taken with respect to a particular IP address, which may have many more than one URL associated with it. Thus, the teachings of the present disclosure may be used to slow or entirely block traffic to and/or from a particular destination(s), or block traffic to an entire category of the classification sets.

Figure 9:
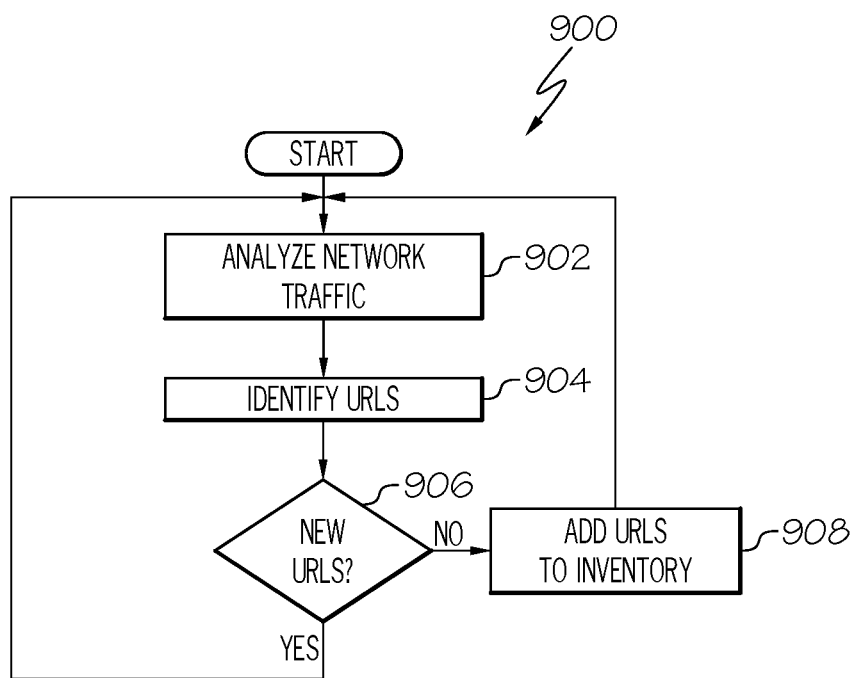
FIG. 9 illustrates a flowchart of network communication analysis, in accordance with another embodiment of the present disclosure.

In accordance with particular aspects of the present disclosure, network traffic may be automatically and/or continuously monitored at or near real time. For example, FIG. 9 illustrates a method 900 that begins at step 902 where network traffic is analyzed. At Step 904, URLs associated with the network traffic are identified.

Next, at step 906, a determination is made as to whether any new URLs are included in the identified URLs. In particular embodiments, this may be done by comparing the identified URLs to URLs previously included in a stored inventory that may be prepared and updated as network traffic is analyzed at or near real-time. If there are no new URLs identified, the method returns to step 902 and continues to analyze network traffic.

However, if any previously unidentified URLs are found, an inventory of URLs may be started or updated at step 908. After updating the inventory, the method returns to step 902 and continues to analyze network traffic.

In particular embodiments, the method 900 may be accomplished continuously and/or at or near real time. In other embodiments, the network traffic may be analyzed at some predetermined threshold. For example, the analysis may be done at predetermined periods of time and/or at predetermined network traffic loads (data transfer rate into or out of the network) or upon receipt of a predetermined amount of data.

Analyzing network traffic to better understand data destinations from the enterprise also provides an opportunity for additional checks and cross checks of the alleged or actual data recipients. For example, data destinations can be checked, validated and/or cross validated in an attempt to identify the receiving entity. This can be accomplished in real time, as destination addresses (e.g., URLs or IP addresses) are identified in the network traffic. The checks and analyses below may be done with respect to all identified destinations (or alleged destinations) continuously and/or at or near real-time, with regard to a destination(s) identified as potentially problematic using other teachings included in this disclosure (e.g., using bipartite graphs, classification sets, or publicly available information about the alleged destination addresses), only with respect to newly identified destination addresses in the network traffic (e.g., outgoing), or only with respect to destination addresses associated with certain critical data (e.g., files with trade secrets or data being monitored for compliance purposes).

Figure 10:
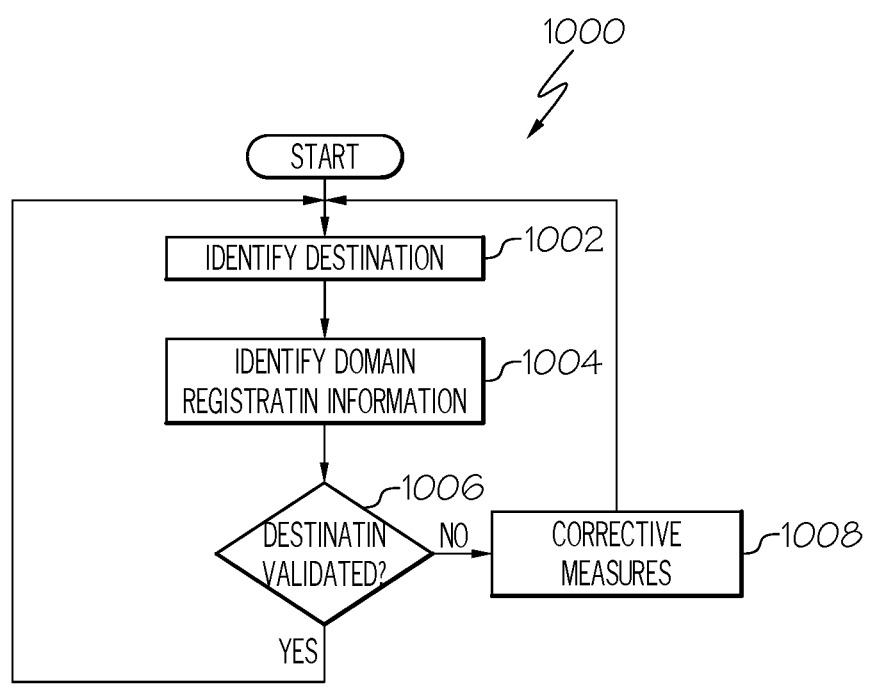
FIG. 10 illustrates a flowchart of network communication analysis, in accordance with another embodiment of the present disclosure.

For example, FIG. 10 illustrates a method 1000 that begins at step 1002 where a destination is identified. In particular embodiments, the destination may be identified using a DNS server and/or identifying a domain that is or is alleged to be the destination. Additional information may be sought to help validate the destination and/or identify the receiving entity and/or information about the receiving entity. Most domain names are registered with a known or ascertainable domain name registrar. After identifying the destination, domain name registration information associated with the domain may be identified at step 1004. Domain name registration information may include domain registration location (e.g., physical address of registrar and/or registrant), domain registration age, domain registration contacts, and whether it was cross signed by a trusted entity (e.g., transitive trust that's established)—a third party that is "vouching" for the domain name registered party (a trusted entity that does cross-signing—e.g., Verisign).

A review of domain name registration information can help ascertain whether the information corresponds with information expected from the recipient, alleged recipient, or intended recipient. For reasons discussed herein, the recipient, alleged recipient and/or intended recipient may be very different parties. For example, a party that types in an incorrect web address or domain name may be taken to a malicious site. So the intended recipient may be American Express at www.amrencanexpress.com. However, an error in the domain (e.g., www amercanexpress.com) may lead to a connection with a malicious site or actor, seeking to take advantage of such common errors. In this instance, American Express is the intended destination, but the address associated with the malicious actor is the actual destination. The malicious actor uses the domain name that is very close to the real domain name in order to cause confusion and leverage common errors in typing. Similarly, a malicious actor may register www.americanexpress.org, or .biz, if such registrations were not already made by the "real" American Express organization. The malicious actor may take additional steps to make the destination seem valid (e.g., the intended destination) by including information, trademarks, trade dress, names or other designations on the website or in the domain name registration information, to appear to be the intended recipient or intended destination. This may make the actual destination become the "alleged" destination by making it appear to be consistent with the intended destination.

At step 1006, it is determined whether the destination address has been validated. Whether or not the destination address is validated may depend at least in part on the degree of correlation between the destination address and any information that is either known about the intended recipient or is expected from the intended recipient (e.g., domain name registration information corresponds with information expected regarding intended destination or alleged destination), then the method can return to step 1002 and continue to monitor and/or analyze network traffic, and identify additional destinations. Some information about the intended recipient may be known (for example, the physical address of corporate headquarters, the domain name registrar of the intended recipient, etc.) and some information that is expected (for example, if the intended recipient is a long established fortune 100 company, expected information would be an "old" domain name registration—registered many years ago).

If the destination address is not validated (e.g., some or all domain name registration information is not consistent with the information that would be expected of the intended recipient) then corrective measures may be taken at step 1008 before continuing back to step 1002. For example, there is an expectation that American Express has a very "old" registration date (i.e., age). If a review identifies a recent domain name registration that would be inconsistent with what would be expected of the intended destination (associated with American Express). In fact, an automated review of domain name registration information may be configured to flag any domain name registration as not validated if it was registered within the last day, week, month, year, etc. Any domain name registration that is suspicious (e.g., registered in a particular location commonly used by malicious actors, registered recently, not cross-signed by a trusted entity, registered to a party with negative publicly available information, etc) may be "flagged" and not indicated as validated, such that an additional analysis can be completed. Thus, the teachings of the present disclosure allow an enterprise to flag and identify impersonators or malicious actors that could be masquerading as the intended recipient of a data stream.

Thus, using network traffic information (e.g., DNS traffic profile), the systems and methods disclosed herein can be used to query the public certificates (domain name registrations) associated with the destination domains for each data exchange partner or those data exchange partners or particular communication streams that have been flagged as potentially problematic. The certificate data attributes such as the date of registration, registration information, registration location, and the profile of the cross-signer provide, allow the system to establish a ranking of the risk profile for each data partner. Any data destinations that rank highly on these metrics are identified and presented to the user for review and further analysis.

Corrective actions may take many forms, in accordance with the teachings of the present disclosure. In extreme example, corrective action may include shutting down outgoing network traffic, or all network traffic. More commonly, corrective action may be targeted to a particular address or data stream (e.g., associated with the identified destination). For example, all traffic associated with a particular URL, domain name, or IP address may be more closely monitored, slowed or shut off completely. The same action may be taken with respect to a particular IP address, which may have many more than one URL associated with it. Thus, the teachings of the present disclosure may be used to slow or entirely block traffic to and/or from a particular destination(s), or block traffic to an entire category of the classification sets.

In particular embodiments, the method 1000 may be accomplished continuously and/or at or near real time. In other embodiments, the network traffic may be analyzed at some predetermined threshold. For example, the analysis may be done at predetermined periods of time and/or at predetermined network traffic loads (data transfer rate into or out of the network) or upon receipt of a predetermined amount of data is received.

In accordance with another embodiment, a method of preventing or limiting the impact from data breaches associated with databases, may include inserting a record in a database that points to (can communicate with) a DNS server on the site of a third party other than the enterprise (e.g., the Cytex server described above). The database record may take the form of a convoluted string in in a one line script that reverts to a DNS server unique to the enterprise. In other words, this technique only requires one unique string of text per database, to implement. To an unsuspecting malicious third party, the string of text will have a similar appearance to any other standard record in the database. But if the database is copied (e.g., exported) then the record/script will communicate with (e.g., ping) the DNS server that is unique to the enterprise but under the control of a third party. That will allow the third party to contact the enterprise and let them know that the database has been and/or is being copied.

As discussed above, in today's modern enterprise, organizations use data as a competitive advantage. Data collected from data partners (users, partners, vendors, and other collaborators) provides insights and business advantages. As business enterprises become more data centric, they tend to be connected with a growing number of data partners (e.g., vendors). It is beneficial for an enterprise to be able to automatically assess the likelihood that a data partner may cause an organization to become vulnerable to a cyberattack or a data breach. Using data collected from the enterprises' network traffic profile (as discussed above and in more detail below), the data partner's assessment, and other publicly available data resources a "trustworthiness score" can be computed for each data partner. An enterprise can use this information to identify the weakness in their data supply chain, take corrective actions, and improve its overall security posture. Such a score can be used to identify weaknesses generally, but also allows for a comparison or "relative" score among vendors so that vendors can be compared to each other, with regard to potential risk.

A data supply chain attack is one where a software, hardware, or operational system is used to inflict damage on an organization. This damage may be in the form of a data exfiltration, where information is disclosed without authorization, stealing of proprietary information, or rendering a system unusable for a certain period of time (or even permanently). These actions cause the attacked organization to suffer from loss of revenue, reputation damage, legal troubles, and loss of its competitive advantage. Organizations mostly focus on bolstering their own defenses and pay little attention to the danger posed by its data supply partners. This can be attributed to the difficulty in identifying the risk, modeling the risk, determining the risk impact, and coming up with a mitigation plan. The teachings disclosed herein simplify the data supply chain risk by identifying the risks posed by its vendors or data supply chain partners, model the risk, determine the risk impact through the model, and suggest remediation for each identified risk.

Figure 11:
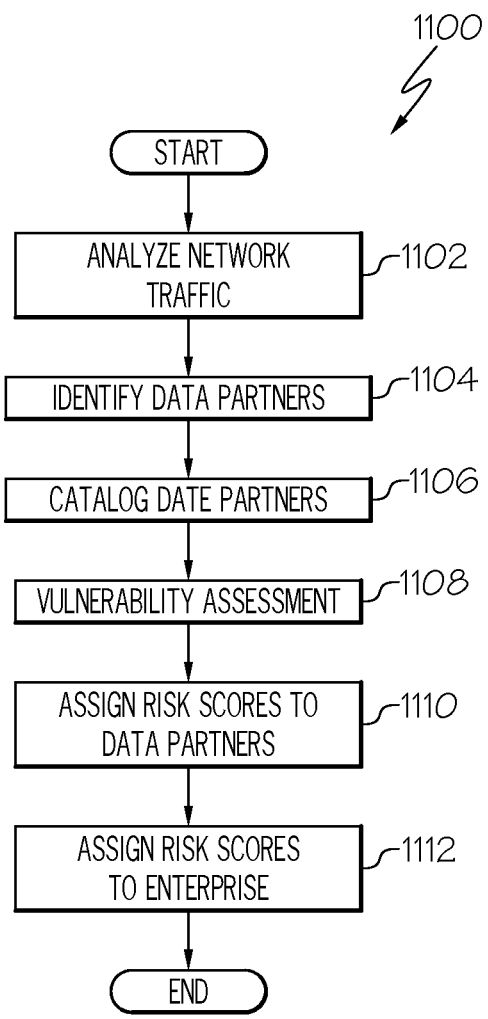
FIG. 11 illustrates a flowchart of network communication analysis, in accordance with another embodiment of the present disclosure.

FIG. 11 illustrates a method 1100 for analyzing data supply partner communications, in accordance with a particular embodiment of the present disclosure. The method begins at step 1102 where network traffic is analyzed. This includes the methods for analyzing communications discussed above, and in some embodiments builds on network surveillance of TCP/IP networks by analyzing the data inflow and outflow to data exchange partners. At step 1104, data partners are identified using the analysis of the data inflow and outflow.

Next, at step 1106, data partners are automatically catalogued. In particular embodiments, this is accomplished through identification of domain names, Universal Resource Locators, and IP addresses associated with the data partners that are derived from the data inflow and outflow.

Once a plurality of data partners are identified, a vulnerability assessment may be performed for each data partner, at step 1108. A variety of techniques may be used for the vulnerability assessment to identify system vulnerabilities on the data partner's network. For example, the teachings disclosed herein may employ one or more of a probe of open ports, system fingerprinting, and Internet Protocol Address reputation queries.

Based upon the vulnerability assessment, a risk score can be assigned to each data partner at step 1110. The risk score is provided on a relative scale (e.g., scale of 1-10, with 10 being highest risk for potential liability associated with data partner) so that various data partners can be compared to each other, and assessed against an "acceptable risk score" predetermined by the enterprise. For example, any data partner with a risk score higher than the predetermined threshold set by the enterprise may be: disqualified from consideration for a relationship or continued relationship with the enterprise; required to perform mitigation sufficient to get risk score below the predetermined threshold; removed from the data supply chain of the enterprise; restricted with regard to the type of data that the enterprise can exchange with the enterprise (e.g., restricted from receiving trade secrets, and/or particularly sensitive data (e.g., PHI, Social Security Nos., etc) but allowed to receive less sensitive data (e.g., customer addresses, credit card data, etc.)).

At step 1112, a risk score can be assigned to the enterprise. The risk score to the enterprise allows the enterprise to compare itself to others that are similarly situated and/or compare to an industry standard established by a third party organization. The risk score also allows the enterprise to determine whether it falls within a range that the enterprise considers "acceptable", or if proactive or remediation measures are necessary to reduce the risk score. The risk score of the enterprise can take into account the risk scores of each data partner, and/or risks or vulnerabilities associated with the physical and digital assets of the enterprise.

The teachings disclosed herein provide insight into an organization's data supply chain without necessarily requiring the installation of agents or intrusive software, which may further degrade the security posture of a given enterprise. They allow for an automated analysis of an enterprises supply chain risk which can run continuously to assess the risk and impact of communications or potential communications with particular data partners, over time. This risk identification, impact analysis, and mitigation can be used in real-time to identify trends, manage risk, and assess how an organization's risk profile would change if and/or when a new data partners is added to the supply chain.

Figure 12:
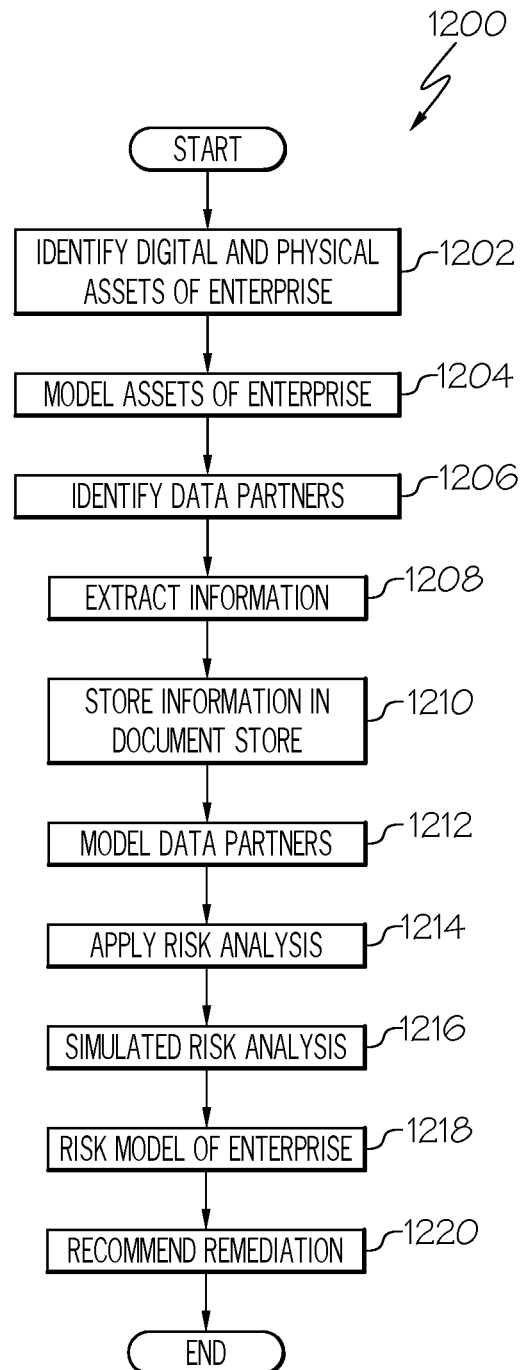
FIG. 12 illustrates a flowchart of network communication analysis, in accordance with another embodiment of the present disclosure.

A method 1200 for risk modeling of data partners in accordance with a particular embodiment of the present disclosure is illustrated in FIG. 12. In particular embodiments, the risk may be modeled by generating a Markov Chain mathematical model. The method begins at step 1202 where all pertinent physical and digital assets of the enterprise are identified. Pertinent assets include those that are included in the data supply chain of the enterprise. Various methods for identifying physical and digital assets associated with an organization or third party are disclosed herein, each of which may be used at least in part for this identification of assets.

Next, at 1204 the assets of the enterprise are modelled. In particular embodiments, the model includes developing a machine interpretable representation of the enterprise by modeling all of the digital and physical assets of the enterprise.

The pertinent data partners of the enterprise are identified at step 1206. Various methods for identifying data partners of an enterprise are discussed throughout this specification, each of which has potential use with this method. At step 1208, information about the data partners is extracted. Various methods for extracting information about each data partner are described herein and may be employed with this method. This includes, for example, extracting information from a DNS server.

In accordance with particular embodiments, information from some or all of the data partners may be stored in a unified data format. This may require that information from some or all of the data partners be converted to a different format than the format in which it was received, in order to allow it to be converted and stored in such a unified data format. This may also include the normalization of the information in order to store the information in the unified data format. Moreover, converting and storing the information in a unified data format may also allow for normalization of the data collected from different ones of the enterprises, for comparison purposes (including risk assessment). This allows, at step 1210, information from some or all of an enterprise's data partners to be stored in a document store in the unified data format, for further processing.

At step 1212, a machine understandable (e.g., readable) representation of the enterprise's data partners is constructed by modeling each data partner, using the information extracted at step 1208 and/or stored at step 1210. Having a machine readable model of the enterprise, and a machine readable model of its data partners, allows for combination of the two models for further analysis, and/or analysis of one or both models in isolation from each other.

At step 1214, a risk analysis is applied to the machine readable model (enterprise only, data partners only, or model that includes both). As part of the risk analysis, algorithms are applied to the model in order to identify potential vulnerabilities. This risk analysis is intended to identify actual vulnerabilities (e.g., open port, malware, questionable software) that exist in the data supply chain.

Next, at step 1216, a simulated risk analysis may be performed using the model and/or other information collected regarding the enterprise and/or its data partners. The simulated model is used to simulate certain changes to the data supply chain. These simulations are discussed above in more detail with regard to the "digital twin" simulations, and all such simulations may be used in accordance with this method. The simulated risk analysis allows, for example, a simulation to be run to determine the probability of an outcome associated with a change. In accordance with the simulation model, various risk scenarios are modeled using a variety of simulation techniques ranging from Markov Chains to Monte Carlo simulation. Markov Chains and Monte Carlo simulations are discussed in more detail above. If the enterprise is considering adding a data partner to the data supply chain, the simulated risk analysis can be used to determine the potential risk associated with adding the data partner in the particular way that the data partner is to be integrated into the data supply chain. Similarly, a simulation can be run to determine the likely impact of adding or removing particular software programs. Simulations can also be run to determine potential improvements from recommended mitigation measures. For example, if the risk analysis or simulated risk analysis result in a recommendation for certain remediation, a simulation can be run on the remediation before it is implemented, and before it impacts the operation of the enterprise and the digital supply chain.

At step 1218, a risk model for the enterprise is generated. The risk model may include components of the risk analysis, or the simulated risk analysis, or both. The risk analysis can identify potential risks and the associated potential liabilities, to determine whether such risks and/or liabilities are inline with the risk tolerance of the enterprise. For example, pursuant to the risk model, the enterprise may be presented with a potential problem or vulnerability, a probability that the problem or vulnerability will lead to an issue, and the likely liability associated with it, if it does lead to an issue. The liability may be financial which would allow for a financial calculation (e.g., 10% chance the vulnerability will be exploited x average loss of $2,000,000 if exploited=$200,000 liability) or the liability may be more subjective (loss of reputation, goodwill, employees, customers, etc.).

Based upon the analysis above, potential remediation may be recommended to the enterprise at step 1220. Remediation may be recommended if the risk profile exceeds the enterprises' risk tolerance. The remediation may also be recommended if the potential liability associated with a vulnerability can be addressed in a way that substantially decreases the potential liability (either lowers the likelihood of the event, or lowers the average estimate liability associated with the event).

In accordance with particular embodiments, the seed value for the risk model are generated by building a baseline of the data partner risk scores. After the model is initialized, tens of thousands of simulations may be run to model the risk state changes, which provides an analytical view of how an organization's risk would change and the impact this would have on the organization's security defense posture. This analytical insight can be used by the organization to assess the impact of the risk and to identify weaknesses in its defense mechanism. The teachings disclosed herein also provide remediation advice for the identified vulnerabilities. This information can be used by security risk managers and/or auditors, or incorporated into other tools to automate the overall risk mitigation.

In accordance with particular embodiments, baseline communication levels can be established for an enterprise, data partner, some or all of the data supply chain in order to identify anomalies that may suggest malicious behavior. For example, the system can monitor the traffic at any of those points to establish a baseline communication (for example baseline DNS or IP traffic flow). After a baseline is established, the system can automatically monitor communications to watch for anomalous behavior. DNS and IP traffic flow can be monitored using a set of metrics such as rate of packet arrival, ratio of domain resolution to errors, and ratio of a particular high-level domain. Baseline thresholds can be set for one or more of these metrics, in order to identify substantial deviations from average or from threshold (e.g., anomalies). These data attributes can be automatically displayed and transposed on a timescale provide a system to track and flag traffic flows that deviate from an established baseline. Using baseline communications and performance to identify anomalies would help identify many of the most common attached (e.g., solar winds attack).

Thus, the teachings of the present disclosure allow an enterprise to: build an inventory of the data partners that they are exchanging data with; ensure that the data exchange is happening with a trusted entity and not an imposter; use the information for audit and compliance purpose; and ensure regulatory compliance with the various applicable data regulatory frameworks mentioned above. More specific monitoring can be accomplished for various types of compliance obligations. For example, for HIPAA compliance, you can cross validate that all data exchange partners have signed a business associate agreement (an example of a HIPAA compliance obligation). Moreover, geomapping (use IP address to track through Internet) can be used to ensure that certain health data is not going outside of a certain country or countries or to a certain country or countries, if a compliance obligation exists that does or does not allow such activity.

The teachings of the present disclosure may also be used to block the name resolution to block outgoing traffic in response to a potential problem or issue that requires further investigation. Similarly, the system can generate and enable a firewall rule that is sent to an on-premise firewall at the enterprise, instructed it to block the outgoing traffic to a particular data partner or destination.

The teachings of the present disclosure may also employ a machine learning algorithm. The machine learning algorithm can crawl, or sift through the input to identify any aberrations from accepted or expected behavior, using any or all of the information referred to within this disclosure. Each identified "risk" or deviation from expectation is scored and the high-impact risks are mitigated by generating a set of remediation rules.

Remediation rules may include firewall rules. For example, firewall and intrusion detection rules can be generated by the machine learning algorithms. These rules may be applied to the firewall and intrusion detection systems to protect the organization against the identified threats. Blacklist and other restrictions may also be employed manually or by the machine learning algorithm. For example, there may be two types of rules. One is blacklist. The system could also send a firewall message to block a specific port if anomalous activity associate with that port is identified.

Various combinations of the teachings disclosed herein may be employed simultaneously, in series or in parallel. For example, one way to use the "digital twin" described with regard to FIG. 3 in combination with the identification of malicious actors or suspicious data destination may include the following: if some malicious traffic is identified coming into or leaving an organization, the digital twin can be used to predict what might be happening within the enterprise (even if there is no longer access to real traffic from the enterprise—e.g., malicious actor shuts down access to the enterprise by the Cytex server.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
    analyzing network traffic sent or received by a host network;
    identifying entities exchanging data with the host network;
    identifying a plurality of applications within the host network used for sending or receiving the exchanged data;
    developing a digital twin of the host network based upon the identified entities exchanging data with the host network and the applications within the host network used for sending or receiving the exchanged data;
    applying stimuli to the digital twin; and
    assessing a likelihood of a change in state within the host network based upon the applied stimuli.

2. The method of claim 1, further comprising:
    identifying domain name service (DNS) queries and responses included within the network traffic;
    dissecting each DNS query to determine its DNS query type;
    using the determined DNS query types and the responses to identify information regarding the host network.

3. The method of claim 2, further comprising using the determined DNS query types and the responses to identify data partner applications outside of the host network being utilized by data partners for sending or receiving the exchanged data.

4. The method of claim 1, further comprising:
    simulating model changes; and
    wherein the stimuli applied to the digital twin are derived from the simulated model changes.

5. The method of claim 4, wherein simulating model changes comprises simulating model changes by employing a Monte Carlo simulation.

6. The method of claim 1, wherein applying stimuli to the digital twin comprises:
    applying a Monte Carlo simulation; and
    using output of the Monte Carlo simulation to conduct a Markov simulation.

7. The method of claim 1, wherein the stimuli applied to the digital twin are derived from anticipated changes to be employed within the host network.

8. The method of claim 1, wherein the stimuli applied to the digital twin are derived from anticipated changes to one or more of the plurality of applications to be employed within the host network.

9. The method of claim 1, wherein the digital twin comprises a binary machine readable model reflecting software applications, hardware, data partners and computer networks included in a data supply chain of an enterprise associated with the host network.

10. A computer configured to access a storage device, the computer comprising:
    a processor; and
    a non-transitory, computer-readable storage medium storing computer-readable instructions that when executed by the processor cause the computer to perform:
        analyzing network traffic sent or received by a host network that includes a plurality of servers, each of the plurality of servers including a respective network interface, processors, storage and software applications forming a part of a data supply chain of an enterprise associated with the host network;
        identifying entities exchanging data with the host network;
        identifying a plurality of applications within the host network used for sending or receiving the exchanged data;
        developing a digital twin of the host network based upon the identified entities exchanging data with the host network and the applications within the host network used for sending or receiving the exchanged data;
        applying stimuli to the digital twin; and
        assessing a likelihood of a change in state within the host network based upon the applied stimuli.

11. The computer of claim 10, wherein the instructions, when executed by the processor, further cause the computer to perform:
- identifying domain name service (DNS) queries and responses included within the network traffic;
- dissecting each DNS query to determine its DNS query type; and
- using the determined DNS query types and the responses to identify information regarding the host network.

12. The computer of claim 11, wherein the instructions, when executed by the processor, further cause the computer to perform:
- using the determined DNS query types and the responses to identify data partner applications outside of the host network being utilized by data partners for sending or receiving the exchanged data.

13. The computer of claim 10, wherein the instructions, when executed by the processor, further cause the computer to perform:
- simulating model changes; and
- wherein the stimuli applied to the digital twin are derived from the simulated model changes.

14. The computer of claim 13, wherein simulating model changes comprises simulating model changes by employing a Monte Carlo simulation.

15. The computer of claim 10, wherein applying stimuli to the digital twin comprises:
- Applying a Monte Carlo simulation; and
- Using output of the Monte Carlo simulation to conduct a Markov simulation.

16. The computer of claim 10, wherein the stimuli applied to the digital twin are derived from anticipated changes to be employed within the host network.

17. The computer of claim 10, wherein the stimuli applied to the digital twin are derived from anticipated changes to one or more of the plurality of applications to be employed within the host network.

18. The computer of claim 10, wherein the digital twin comprises a binary model reflecting software applications, hardware, data partners and computer networks included in a data supply chain of an enterprise associated with the host network.

19. A computer program product, comprising:
- a non-transitory computer-readable storage medium having computer-readable program code embodied therewith, the computer-readable program code comprising:
- computer-readable program code configured to analyze network traffic sent or received by a host network;
- computer-readable program code configured to identify entities exchanging data with the host network;
- computer-readable program code configured to identify a plurality of applications within the host network used for sending or receiving the exchanged data;
- computer-readable program code configured to develop a digital twin of the host network based upon the identified entities exchanging data with the host network and the applications within the host network used for sending or receiving the exchanged data;
- computer-readable program code configured to apply stimuli to the digital twin; and
- computer-readable program code configured to assess a likelihood of a change in state within the host network based upon the applied stimuli.

20. The computer program product of claim 19, the computer-readable program code further comprising:
- computer-readable program code configured to identify domain name service (DNS) queries and responses included within the network traffic;
- computer-readable program code configured to dissect each DNS query to determine its DNS query type;
- computer-readable program code configured to use the determined DNS query types and the responses to identify information regarding the host network.

* * * * *